US007956858B2

(12) United States Patent
Sprague et al.

(10) Patent No.: US 7,956,858 B2
(45) Date of Patent: Jun. 7, 2011

(54) INTEGRATED PHOTONICS MODULE AND DEVICES USING INTEGRATED PHOTONICS MODULES

(75) Inventors: Randall B. Sprague, Hansville, WA (US); Joshua O. Miller, Woodinville, WA (US); Margaret K. Brown, Seattle, WA (US); Mark O. Freeman, Snohomish, WA (US); Maarten Niesten, Kirkland, WA (US); Bin Xue, Mukilteo, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 12/896,185

(22) Filed: Oct. 1, 2010

(65) Prior Publication Data
US 2011/0025930 A1 Feb. 3, 2011

Related U.S. Application Data

(62) Division of application No. 11/786,423, filed on Apr. 10, 2007, now Pat. No. 7,834,867.

(60) Provisional application No. 60/791,074, filed on Apr. 11, 2006.

(51) Int. Cl.
*G06F 3/038* (2006.01)
(52) U.S. Cl. .................. 345/204; 348/757; 359/201
(58) Field of Classification Search .................. 345/204; 359/201, 224, 251, 281, 292, 333, 341.1, 359/341.3; 385/15, 19, 39, 49, 88, 93; 348/757
See application file for complete search history.

(56) References Cited

U.S. PATENT DOCUMENTS

| | | | |
|---|---|---|---|
| 5,045,983 A | 9/1991 | Shields et al. | |
| 5,767,924 A | 6/1998 | Hiroki et al. | |
| 5,802,222 A | 9/1998 | Rasch et al. | |
| 5,848,211 A | 12/1998 | Yang et al. | |
| 5,920,361 A | 7/1999 | Gibeau et al. | |
| 6,002,507 A * | 12/1999 | Floyd et al. ............ | 359/201.1 |
| 6,218,679 B1 | 4/2001 | Takahara et al. | |
| 6,295,154 B1 | 9/2001 | Laor et al. | |
| 6,480,325 B1 | 11/2002 | Batchko et al. | |
| 6,501,530 B2 | 12/2002 | Kurtz et al. | |
| 6,512,622 B2 | 1/2003 | Wine | |
| 6,540,361 B1 | 4/2003 | Hayashi | |
| 6,542,307 B2 | 4/2003 | Gleckman et al. | |

(Continued)

FOREIGN PATENT DOCUMENTS
JP 2001-264662 9/2001
(Continued)

*Primary Examiner* — Kimnhung Nguyen
(74) *Attorney, Agent, or Firm* — Kevin D. Wills

(57) ABSTRACT

An integrated photonics module includes at least one light source and a MEMS scanner coupled to and held in alignment by an optical frame configured for mounting to a host system. According to some embodiments, the integrated photonics module may include a plurality of light sources and a beam combiner coupled to the optical frame. According to some embodiments, the integrated photonics module includes a selective fold mirror configured to direct at least a portion of emitted light toward the MEMS scanner in a normal direction and pass scanned light through to a field of view. The selective fold mirror may use beam polarization to select beam passing and reflection. The integrated photonics module may include a beam rotator such as a quarter-wave plate to convert the polarization of the emitted light to a different polarization adapted for passage through the fold mirror. The integrated photonics module may include one or more light detectors.

10 Claims, 33 Drawing Sheets

U.S. PATENT DOCUMENTS

| | | |
|---|---|---|
| 6,590,606 B1 | 7/2003 | Hiller et al. |
| 6,736,517 B2 | 5/2004 | Sherman et al. |
| 6,882,462 B2 * | 4/2005 | Helsel et al. ............. 359/292 |
| 7,262,765 B2 * | 8/2007 | Brown et al. ............. 345/207 |
| 2001/0022566 A1 | 9/2001 | Okazaki |
| 2002/0190922 A1 | 12/2002 | Tsao |
| 2003/0011751 A1 | 1/2003 | Sakata et al. |
| 2003/0117689 A1 * | 6/2003 | Helsel et al. ............. 359/292 |
| 2004/0080718 A1 | 4/2004 | Kojima |
| 2005/0232533 A1 | 10/2005 | Velsher |
| 2006/0018609 A1 | 1/2006 | Sonoda et al. |
| 2006/0279663 A1 | 12/2006 | Wittenberg et al. |
| 2006/0279664 A1 | 12/2006 | Tan et al. |
| 2008/0198471 A1 | 8/2008 | Amitai |

FOREIGN PATENT DOCUMENTS

| | | |
|---|---|---|
| JP | 2003-021800 | 1/2003 |
| JP | 2003-295108 | 10/2003 |
| JP | 2006-091072 | 4/2006 |
| WO | WO-0210855 | 2/2002 |
| WO | WO-02/091077 | 11/2002 |

\* cited by examiner

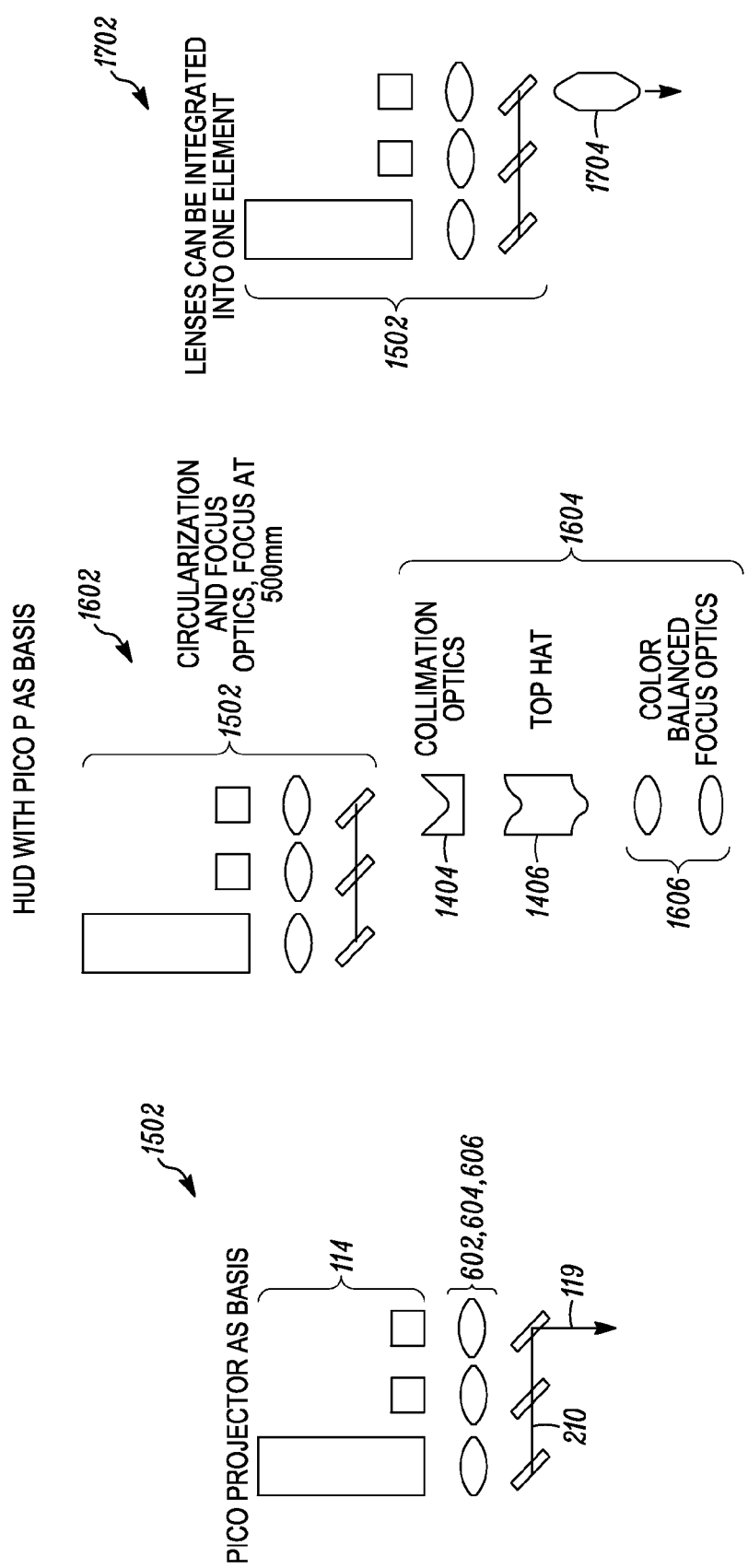

INTEGRATED PHOTONICS MODULE AND DEVICES USING INTEGRATED PHOTONICS MODULES

CROSS-REFERENCE TO RELATED APPLICATIONS

This application is a divisional of U.S. patent application Ser. No. 11/786,423, filed on Apr. 10, 2007, which claims priority from U.S. Provisional Patent Application Ser. No. 60/791,074, filed Apr. 11, 2006. Both are hereby incorporated by reference.

BACKGROUND

Video displays are used in a wide variety of applications, including portable and fixed-location applications. In at least some applications, and particularly in some portable applications, viewable screen size has heretofore been limited by the physical extent of product packaging.

OVERVIEW

An integrated photonics module provides a compact swept-beam display that may be integrated into a range of systems. According to some embodiments, the compact swept-beam display may be configured to project an image having a physical extent larger than the physical extent of a system, product, or package housing the integrated photonics module.

According to some embodiments, an integrated photonics module includes one or a plurality of light sources such as lasers, beam shaping optics, combiner optics, a MEMS scanner, and one or more mechanical components such as an optical frame to facilitate mounting and maintain optical alignment. According to some embodiments, the integrated photonics module may include some or all of MEMS drive electronics, light source drive electronics, sensors, and video electronics. According to various embodiments, the MEMS drive electronics may include a MEMS controller, D/A and/or ND converter(s), and a MEMS drive amplifier(s). Video controller electronics may include a light source controller, D/A converter(s), and light source drive amplifier(s). According to other embodiments, an output of an integrated photonics module may substitute a different interface for the beam scanner such as a fiber coupler configured to deliver light to a remote scanner.

BRIEF DESCRIPTION OF THE DRAWINGS

FIG. 15 is a diagram illustrating of at least a portion of an integrated photonics module for a portable scanned beam projector according to an embodiment.

FIG. 16 is a diagram illustrating an adaptation of at least a portion of the integrated photonics module of FIG. 15 to a scanned beam heads-up display application according to an embodiment.

FIG. 17 is a diagram illustrating the integration of lens elements of FIG. 16 into an integrated lens according to an embodiment.

DETAILED DESCRIPTION

Figure 1:
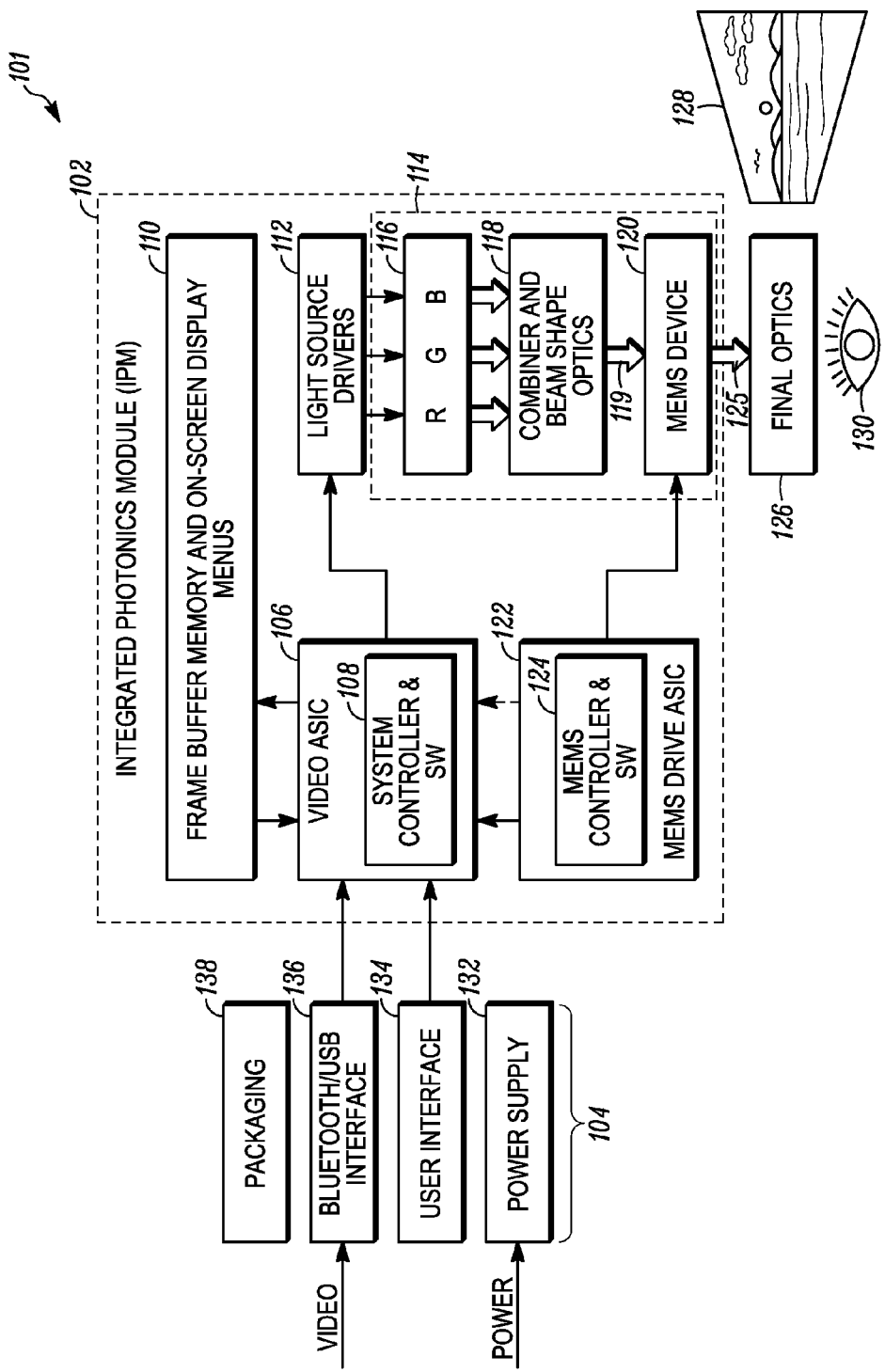
FIG. 1 is a block diagram of an integrated photonics module according to an embodiment.

FIG. 1 is a block diagram of an electronic device 101 including an integrated photonics module 102 for displaying images such as video images according to an embodiment. According to the illustrative embodiment, the integrated photonics module 102 may include interfaces to system resources 104. Video controller electronics 106, which may be embodied as an integrated video application-specific integrated circuit (ASIC) including a system controller and software 108, receives an input video signal. The video controller electronics 106 may at least temporarily buffer received video images in video memory 110, which may include frame buffer memory and on-screen display menus. When it is time to display a new video frame, the video controller electronics 106 reads the cached video frame from the video memory 110 and sequentially drives one or more light source drivers 112 to a sequence of brightness values corresponding to pixel values in the input video signal. The light source drivers 112 drive one or more light sources 116, which may be included in an integrated optical engine portion 114 of the integrated photonics module 102, according to an embodiment. The light sources 116 create one or more modulated beams of light that may be shaped and combined by the combiner and beam shaping optics 118 into a modulated composite beam of light 119. The light sources 116 may, for example, comprise red, green, and blue modulated lasers. According to some embodiments, the modulated composite beam of light 119 may be directed toward a scanner 120, which may for example be a MEMS scanner, operable to scan the modulated composite beam over a field of view (FOV) to create an image.

While the video controller electronics 106 drives the light source drivers 112, it simultaneously drives a scanner controller 122, which may optionally be embodied as a scanner drive ASIC that may, according to some embodiments, also contain a scanner controller and software 124. The scanner controller 122 is operable to drive the scanner 120 to sequentially scan the emitted light across the FOV as a modulated scanned beam of light 125 in a periodic scan pattern.

The scanner 120 deflects the modulated beam of light across the FOV to produce a scanned beam of light 125. The scanned beam of light 125 may optionally be conditioned and/or relayed by final optics 126 to produce a video image 128.

Taken together, the light sources 116, the combiner and beam shaping optics 118, and the scanner 120, along with mechanical mounting structures, actuators, etc., may comprise an integrated optical engine 112; which may in turn comprise an integrated photonics module. Instantaneous positions of the scanned beam of light 125 sequentially illuminate spots in the FOV, the FOV comprising a display surface, exit pupil expander (EPE), or projection screen. To display an image, substantially all the spots in the FOV are sequentially illuminated, nominally with an amount of power proportional to the brightness of an input video image pixel corresponding to each spot.

While the beam illuminates the spots, a portion of the illuminating light beam is reflected or scattered as scattered energy. A portion of the scattered light energy may travel to one or more viewers 130. Persistence of vision in the viewer's eye and mind integrates the sequence of illuminated spots in the FOV into a recognizable video image 128 that may comprise static and/or moving images.

According to some embodiments, light detectors (not shown) may also be aligned to receive a portion of the scattered light energy from the FOV. A variety of processing may be applied to the received scattered light energy to provide functionality. Some embodiments of the functionality of detectors that may be included as a portion of an integrated photonics module. Such detectors may be aligned to receive de-scanned energy off the scanner via a retro-collective or confocal arrangement, or may be aligned to receive light directly or through relay optics from the FOV via a staring detection arrangement.

The light sources 116 may include multiple emitters such as, for instance, light emitting diodes (LEDs), lasers, thermal sources, arc sources, fluorescent sources, gas discharge sources, or other types of emitters. According to one embodiment, a light source 116 comprises a red laser diode having a wavelength of approximately 635 to 670 nanometers (nm). According to another embodiment, the light sources 116 comprises three lasers including a red diode laser operable to emit a beam at approximately 635 nm; a green diode-pumped solid state (DPSS) laser such as frequency-doubling or second harmonic generation (SHG) laser excited by an infrared laser diode at about 1064 nm wavelength, the green SHG laser being operable to emit a green beam of light at about 532 nm; and a blue laser diode operable to emit light at about 473 nm. While some lasers may be directly modulated, other lasers may require external modulation such as an acousto-optic modulator (AOM) for instance. In the case where an external modulator is used, it is considered part of the light source 116. Laser diode light sources are illustrated as part of integrated photonics module embodiments shown below.

The beam combining and shaping optics 118 are aligned to receive the beams of light emitted by the light sources and to combine some or all of the beams into a single beam. The beam combining and shaping optics 118 may also include beam-shaping optics such as one or more circularizing lenses, collimating lenses, focusing lenses, relay lenses, and/or apertures and wavelength selecting optics such as birefringent filters, gel filter, hot mirrors, etc. Additionally, while the wavelengths described have been in the optically visible range, other wavelengths may be within the scope of the invention.

According to various embodiments, the scanner 120 may be formed using many known technologies such as, for instance, a rotating mirrored polygon, a mirror on a voice-coil, a mirror affixed to a high speed motor, a mirror on a bimorph beam, an in-line or "axial" gyrating scan element, a MEMS scanner, or other type. A MEMS scanner may be of a type described in U.S. patent application Ser. No. 10/984,327, entitled MEMS DEVICE HAVING SIMPLIFIED DRIVE, for example, incorporated herein by reference.

In the case of 1D scanners, the scanner may include a first beam director driven to scan the output beam along a single axis and a second beam director driven to scan the output beam in a second axis. In such a system, both scanners are referred to as a scanner 120. In the case of a 2D scanner, scanner 120 is driven to scan output beam 125 along a plurality of axes (optionally through final optics 126) to sequentially illuminate pixels in the field of view to produce the image 128.

For compact and/or portable display systems 101, a MEMS scanner is often preferred, owing to the high frequency, durability, repeatability, and/or energy efficiency of such devices. A bulk micro-machined or surface micro-machined silicon MEMS scanner may be preferred for some applications depending upon the particular performance, environment or configuration. One exemplary MEMS scanner embodiment is presented in perspective in FIG. 12. Other embodiments may be preferred for other applications.

A 2D MEMS scanner embodiment of the scanner 120 scans one or more light beams 125 at high speed in a pattern that covers an entire projection screen or a selected region of a projection screen within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

The integrated photonics module 102 may be embodied as monochrome, as full-color, or hyper-spectral. In some embodiments, it may also be desirable to add color channels between the conventional RGB channels used for many color displays. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels, for instance as luminance modulation.

The system resources 104 may include a power supply 132, user interface 134, video interface 136, and packaging 138. The video interface may include, for example a USB port, Bluetooth, Wi-Fi, Firewire, SD socket, IRdA port, or other interface to receive images for projection. The video interface may communicate with the video control electronics 106 using a variety of interfaces including Bluetooth, USB, etc., according to various embodiments. According to an embodiment, the system resources include an operating system capable of retrieving images or video from a passive storage device such as a USB drive, SD card or other memory, and projecting images or video individually or in a slide show. This may be useful, for example, for accepting a memory device from a digital camera and projecting recently captured images to friends and family.

Figure 2:
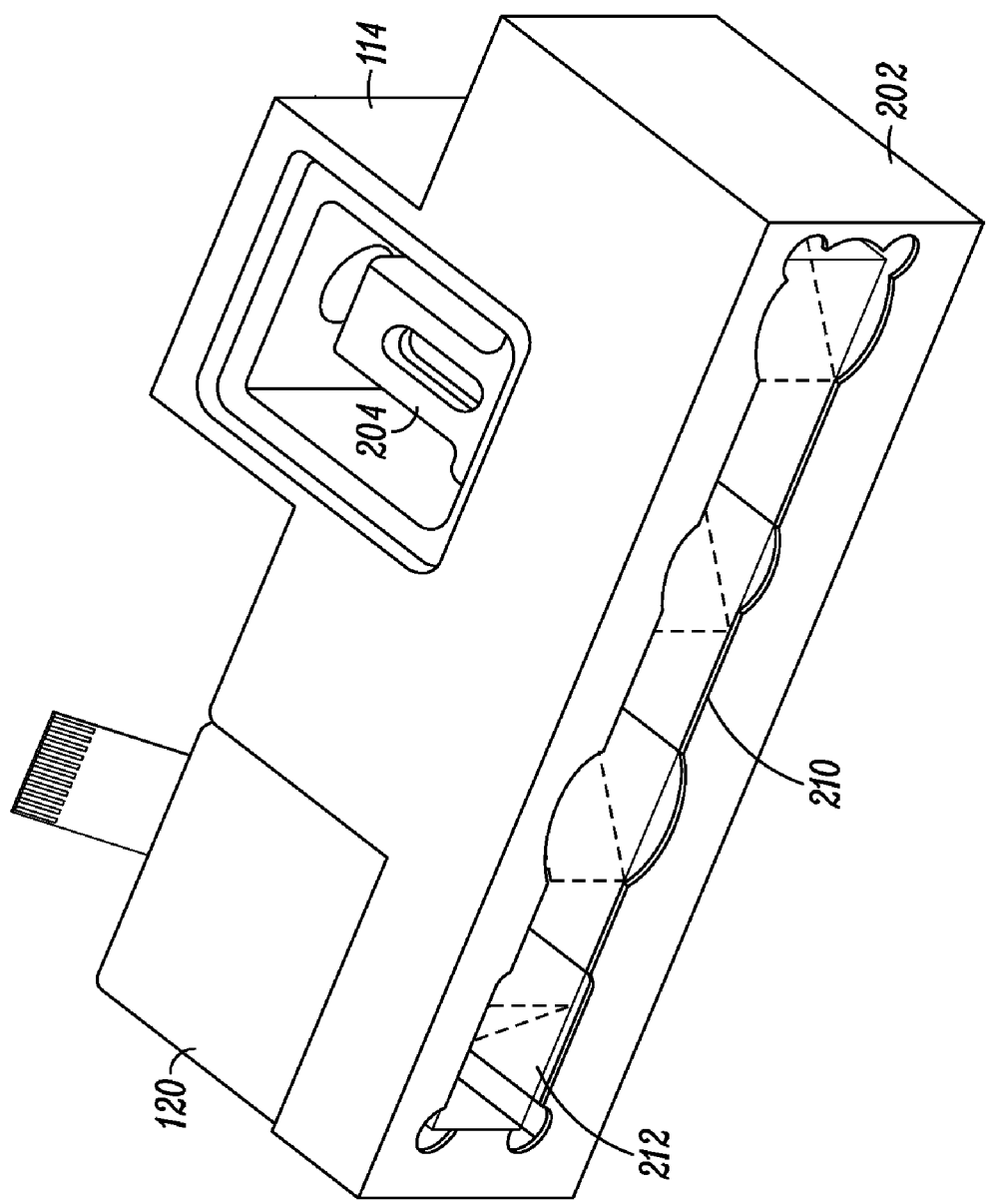
FIG. 2 is a perspective view of at least a portion of an integrated photonics module according to an embodiment.
Figure 3:
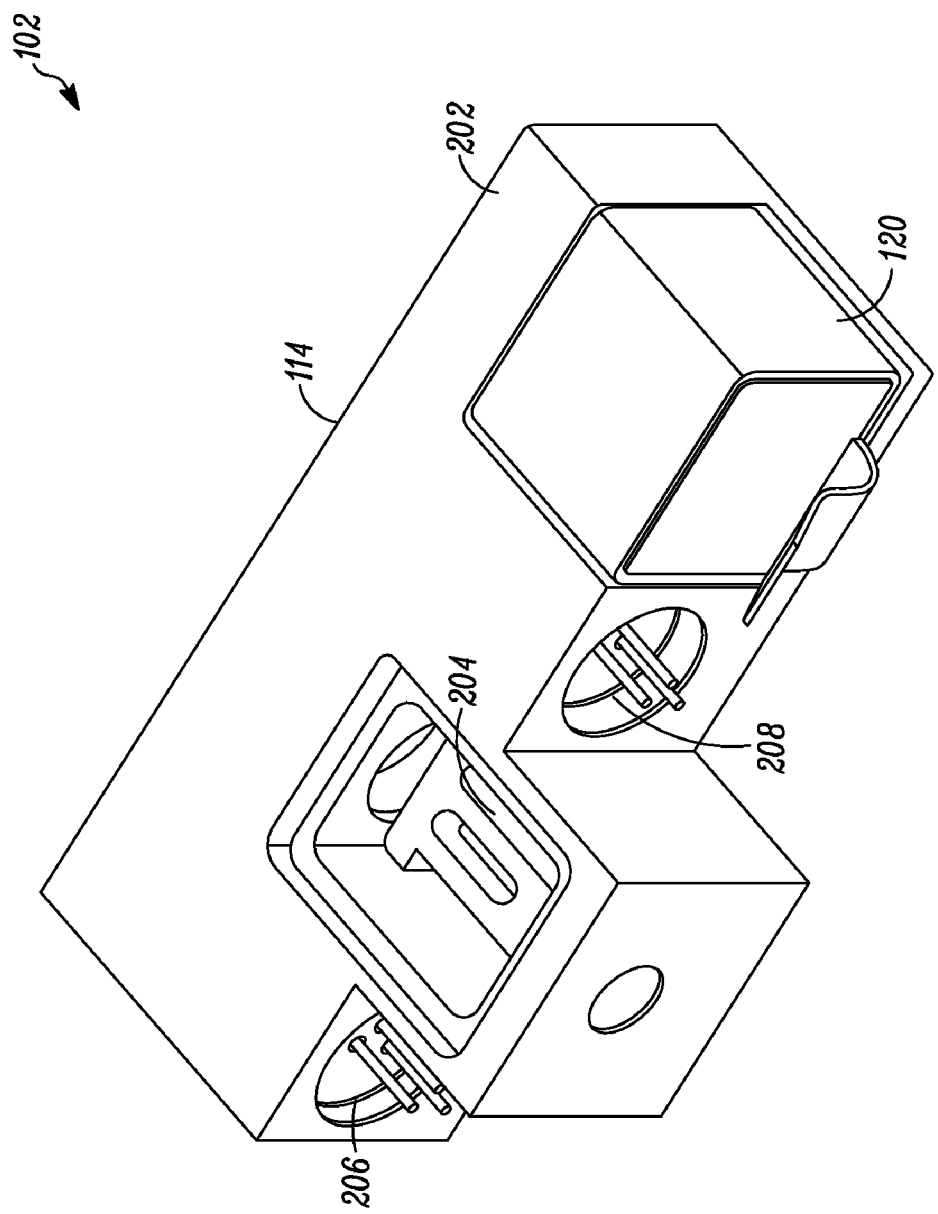
FIG. 3 is another perspective view of at least a portion of an integrated photonics module according to an embodiment.
Figure 4:
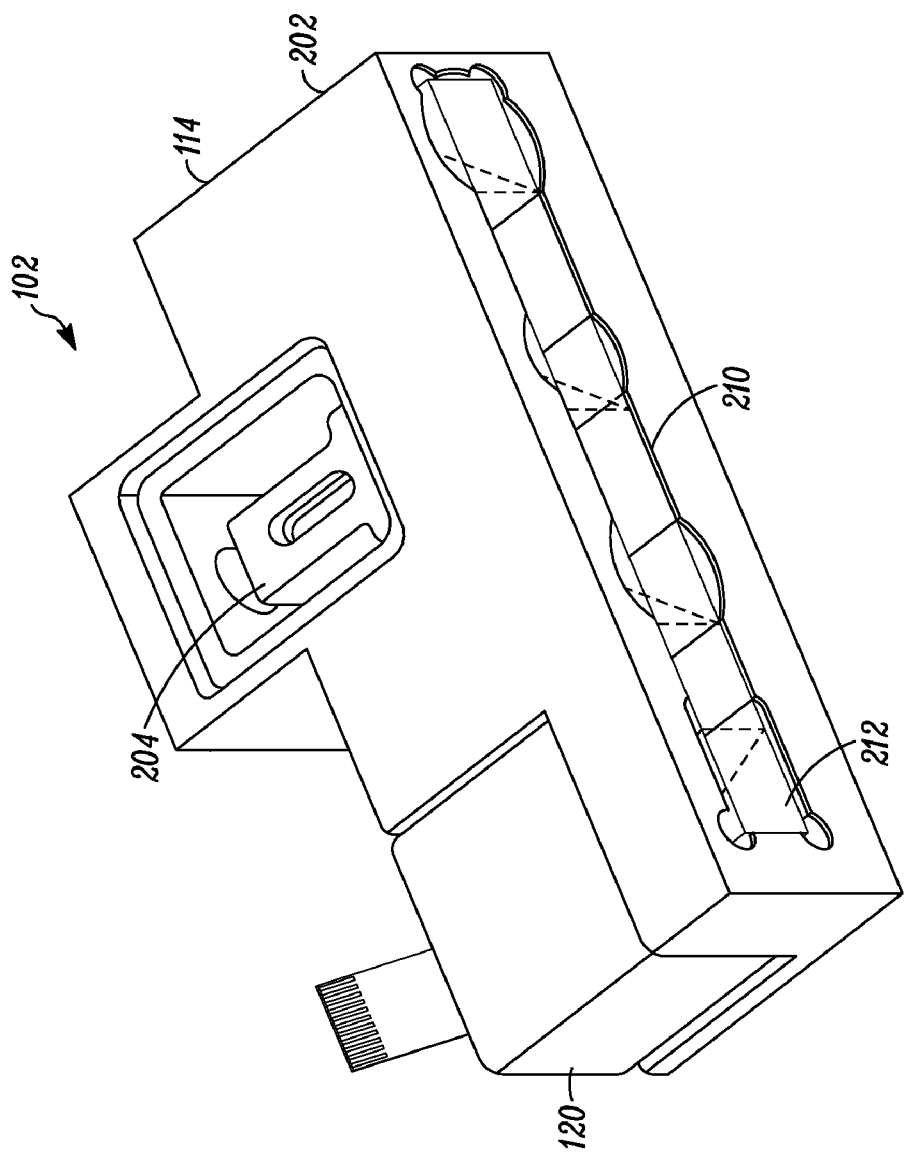
FIG. 4 is another perspective view of at least a portion of an integrated photonics module according to an embodiment.
Figure 5:
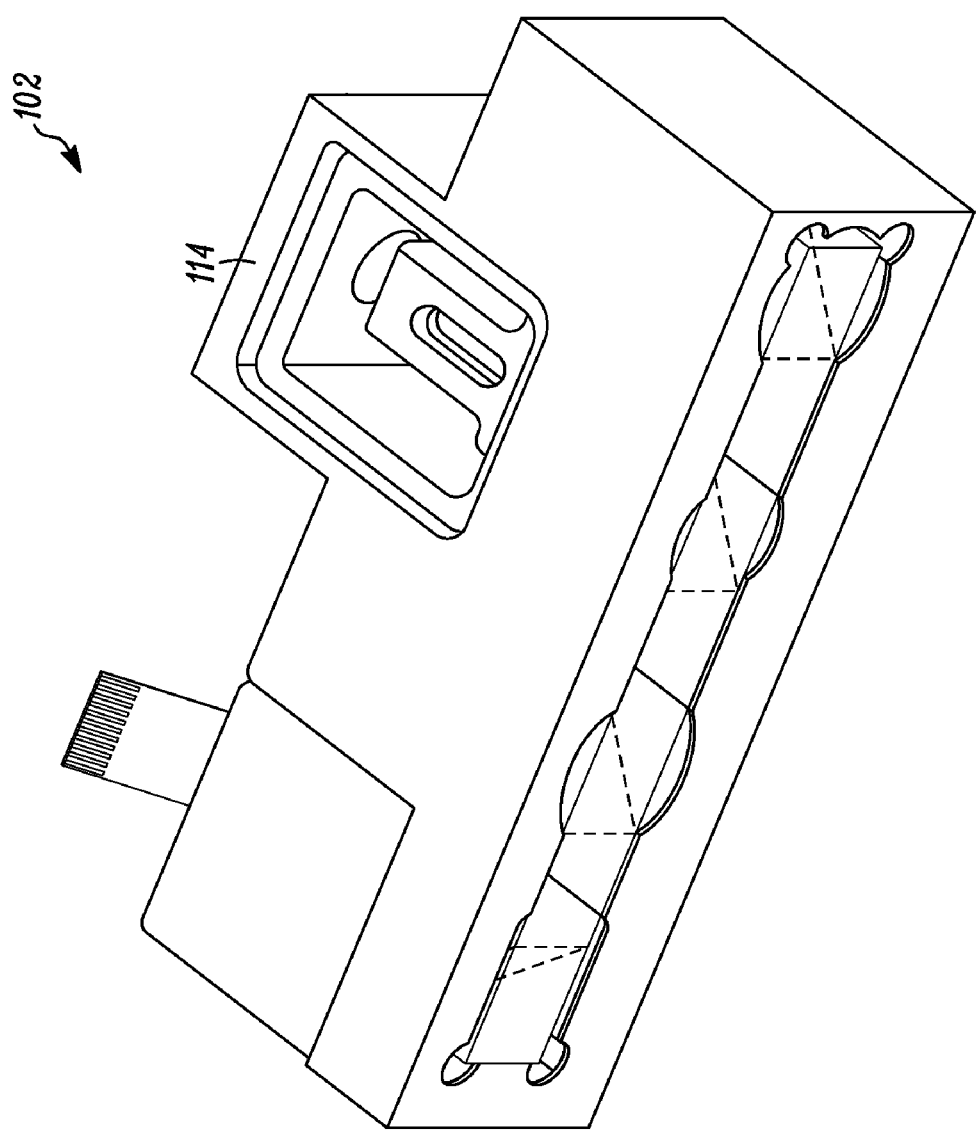
FIG. 5 is another perspective view of at least a portion of an integrated photonics module including dimensions according to an embodiment.

FIGS. 2, 3, and 4 are a series of perspective views of an integrated optical engine portion 114 of an integrated photonics module 102 according to an embodiment. An optical frame 202 supports three light sources 204, 206, and 208; beam shaping optics (not shown); a beam combiner 210; and a beam scanner 120 in optical alignment with one another to deliver a scanned modulated beam through an output face 212 as shown. FIG. 5 provides dimensions for the integrated optical engine portion 114 of the integrated photonics module 102 according to an embodiment. As may be seen, the outer dimensions of the package (11.5 mm high by 23 mm deep by 40 mm wide, or less than ½ by 1 by 1⅝ inches) may be very compact, allowing for easy integration into even size-constrained portable electronic devices. This amounts to just 10.6 cubic centimeters (0.65 cubic inches). As may be seen in figures below, this package provides relatively generous spacing between light sources. Further shrinking of the package in width is possible by creating tighter spacing between the light sources.

According to some embodiments, the optical frame 202 may be thermally coupled to the light sources 204, 206, and 208. Such thermal coupling may allow the optical frame to act as a heat sink for the light sources. A thermistor, thermocouple, etc. may be thermally coupled to the optical frame 202 to monitor temperature. The light output may be modified, shut down, etc. if it is determined the temperature is out of an operating range.

Figure 6:
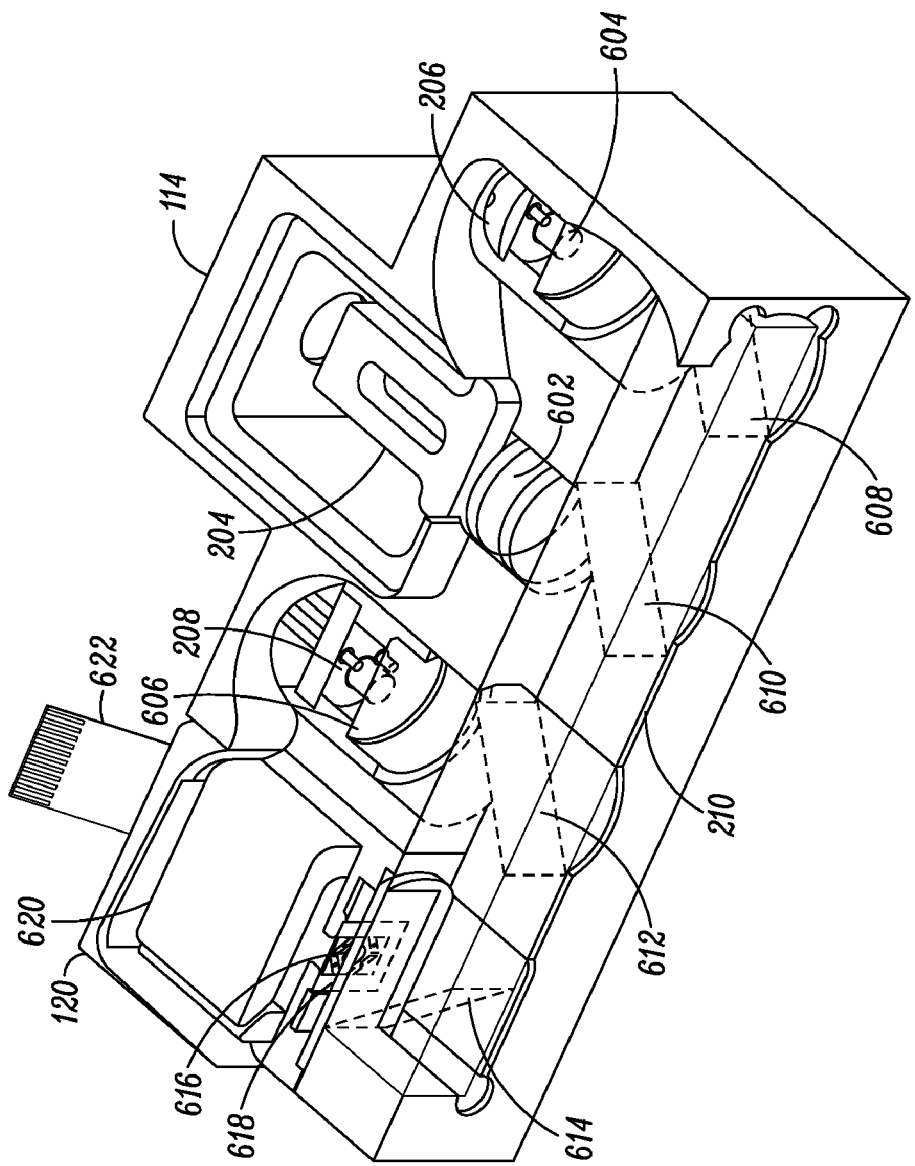
FIG. 6 is a cut-away view of at least a portion of the integrated photonics module of FIGS. 2-5 according to an embodiment.
Figure 7:
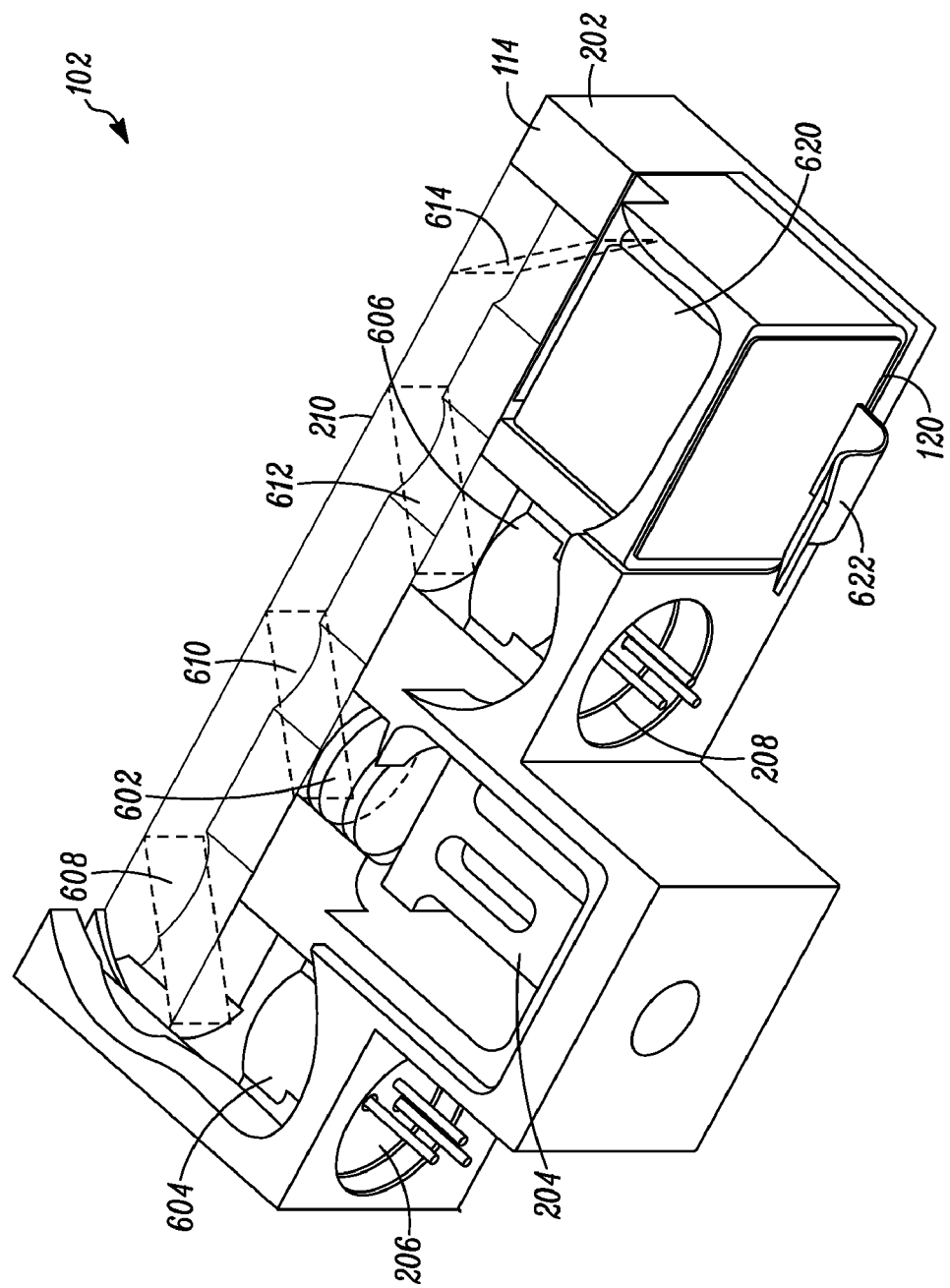
FIG. 7 is another cut-away view of at least a portion of the integrated photonics module of FIGS. 2-5 according to an embodiment.
Figure 8:
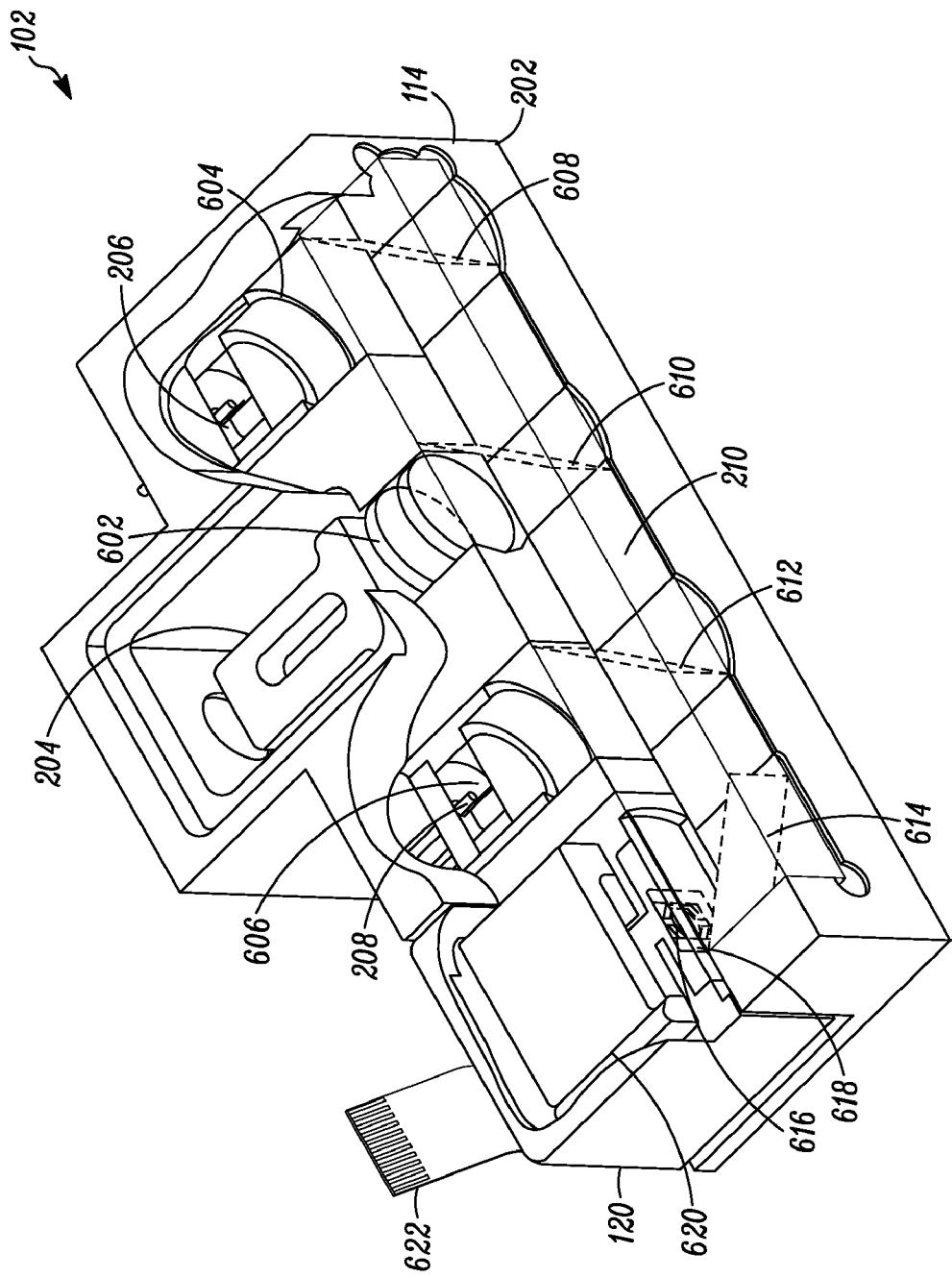
FIG. 8 is another cut-away view of at least a portion of the integrated photonics module of FIGS. 2-5 according to an embodiment.

FIGS. 6, 7, and 8 are a series of perspective cut-away views of the integrated optical engine portion 114 portion of the integrated photonics module 102 corresponding to the respective perspectives of FIGS. 2-4 according to an embodiment. The illustrative beam shaping optics 602, 604, and 606 may be seen positioned to receive light beams from the respective light sources 204, 206, and 208. When the light source 204 includes a SHG laser, its corresponding beam shaping optics 602 may include an infrared-excluding filter configured to prevent infrared pump light from exiting the light source 204. The respective mirrors 608, 610, and 612 of the beam combiner 210 may be seen aligned to receive and direct beams of light from the light sources 206, 204, and 208 along the long axis of the beam combiner as a composite beam. A selective fold mirror 614 is aligned to receive the composite beam and direct it toward the mirror 616 of a MEMS scanner 618 component of the scanner 120. The selective fold mirror 614 may be aligned to launch the composite beam toward the scan mirror 616 from a direction substantially normal to the nominal mirror (center crossing) position. Such an arrangement may be useful to minimize geometric distortion in the scanned beam. Additional components according to embodiments including magnets 620 and interface cable 622 of the scanner 120 may also be seen in FIGS. 6-8.

Figure 9:
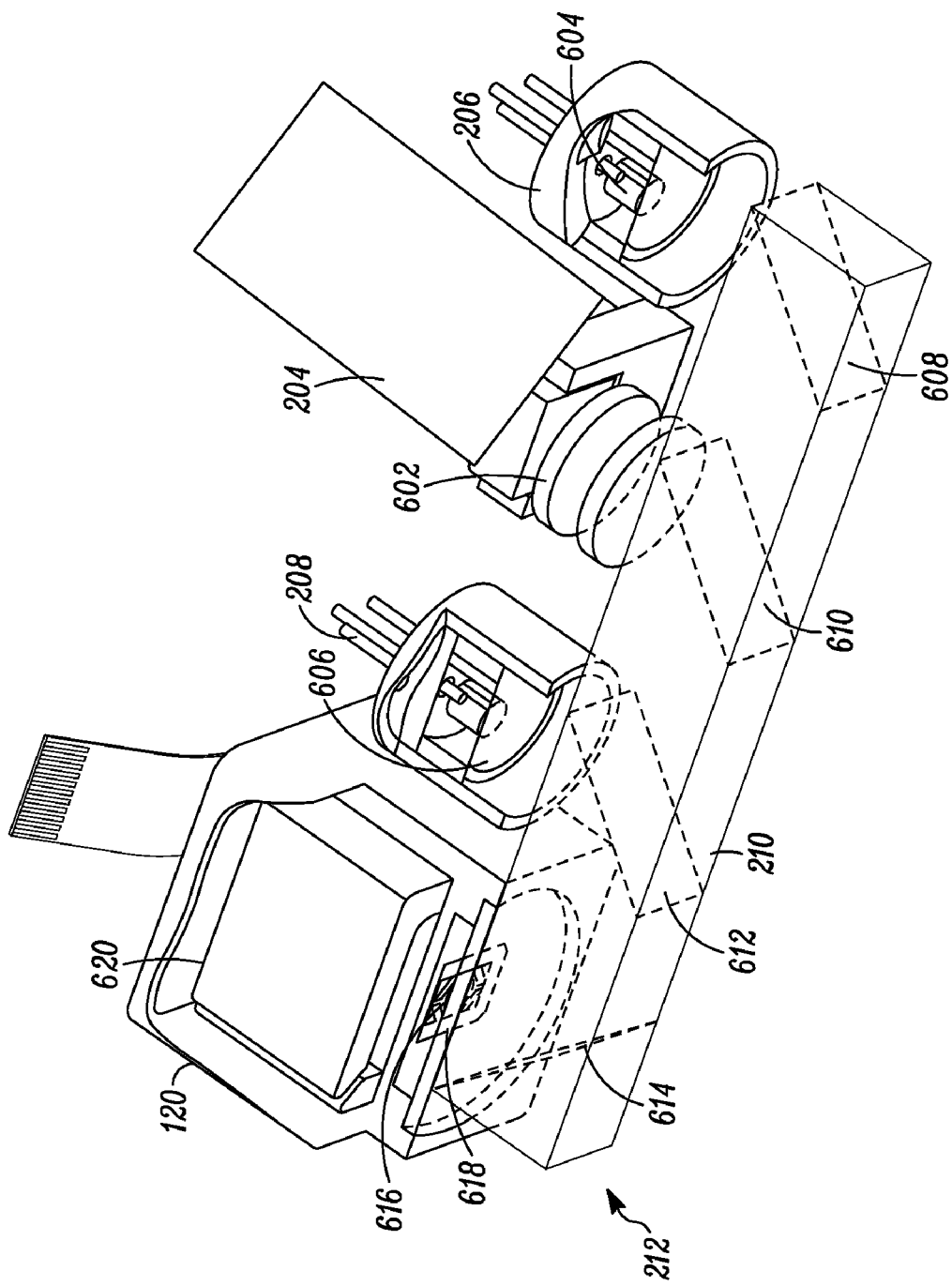
FIG. 9 is a view of some of the principal optical components of the integrated photonics module of FIGS. 2-8 according to an embodiment.

FIG. 9 is a view showing the alignment of some of the principal optical components of the integrated photonics module of FIGS. 2-8 according to an embodiment. The components are as described above. The scanned beam exit face 212 in the beam combiner 210 of the integrated photonics module may be seen.

Figure 10:
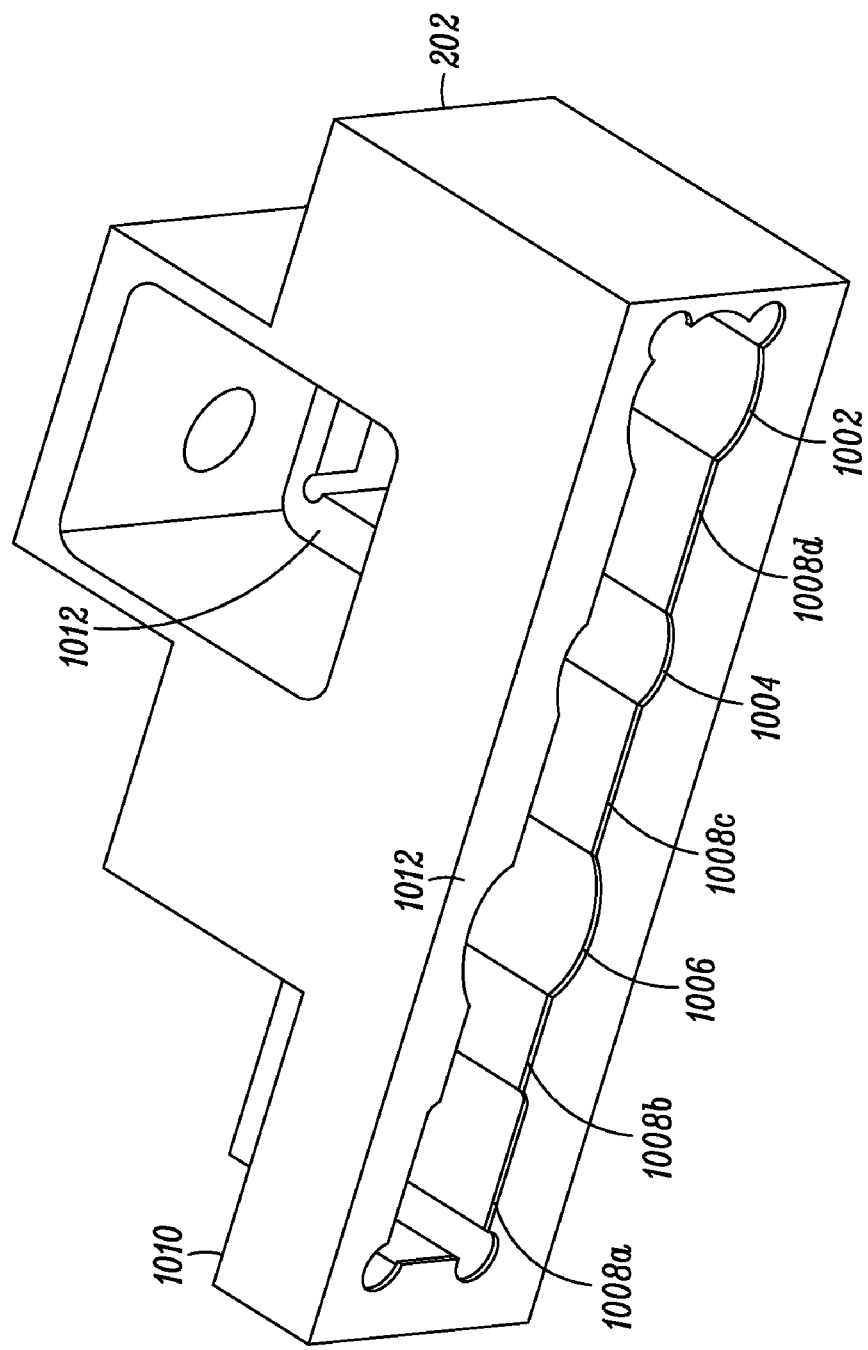
FIG. 10 is a view of an optical frame for the integrated photonics module of FIGS. 2-8 according to an embodiment.

FIG. 10 is a view of an optical frame 202 for the integrated photonics module of FIGS. 2-8 according to an embodiment. According to an embodiment, the optical frame 202 may be manufactured from a metal such as aluminum, titanium, etc. using a die-casting process. Alternatively, the optical frame 202 may comprise an injection molded plastic such as a glass-filled or other dimensionally-stable plastic. Optionally, secondary machining operations may be performed on the optical frame to provide precise dimensional tolerances and or achieve other design preferences. According to other embodiments, the optical frame 202 may be manufactured using machining and/or sheet metal forming operations. Alternative materials and manufacturing processes will be apparent to those skilled in the art and, unless specified otherwise, are intended to fall within the scope of various embodiments. The optical frame 202 may optionally be a one- or two-piece component as shown. Optionally, the optical frame 202 may comprise a larger number of components such as, for example, a printed circuit board and components thereon, separate emitter/optics/combiner and scanner portions, etc.

The optical frame 202 may include bores 1002, 1004, and 1006 formed to receive respective light sources 206, 204, and 208 and associated beam forming optics. The optical frame 202 may further include one or more location faces 1008 (1008a, 1008b, 1008c, and 1008d shown) formed to receive and align a selective fold mirror, beam combiner, etc. A face 1010 may be formed to receive a scanner (not shown) in alignment. Additionally, other mounting faces and features 1012 may be formed along other axes.

According to some embodiments, the optical components may be mechanically clamped into the optical frame 202 with a cover portion (not shown) such as with fasteners (e.g. screws, rivets, etc), using adhesive, by clamping, etc. According to other embodiments, one or more of the optical components may be mechanically coupled to the optical frame 202 using discrete or integrated fastening technology, adhesive (e.g. UV-cured optical adhesive), etc. In cases where components are directly coupled to the optical frame, a separate cover portion may be omitted, according to embodiments.

Figure 11:
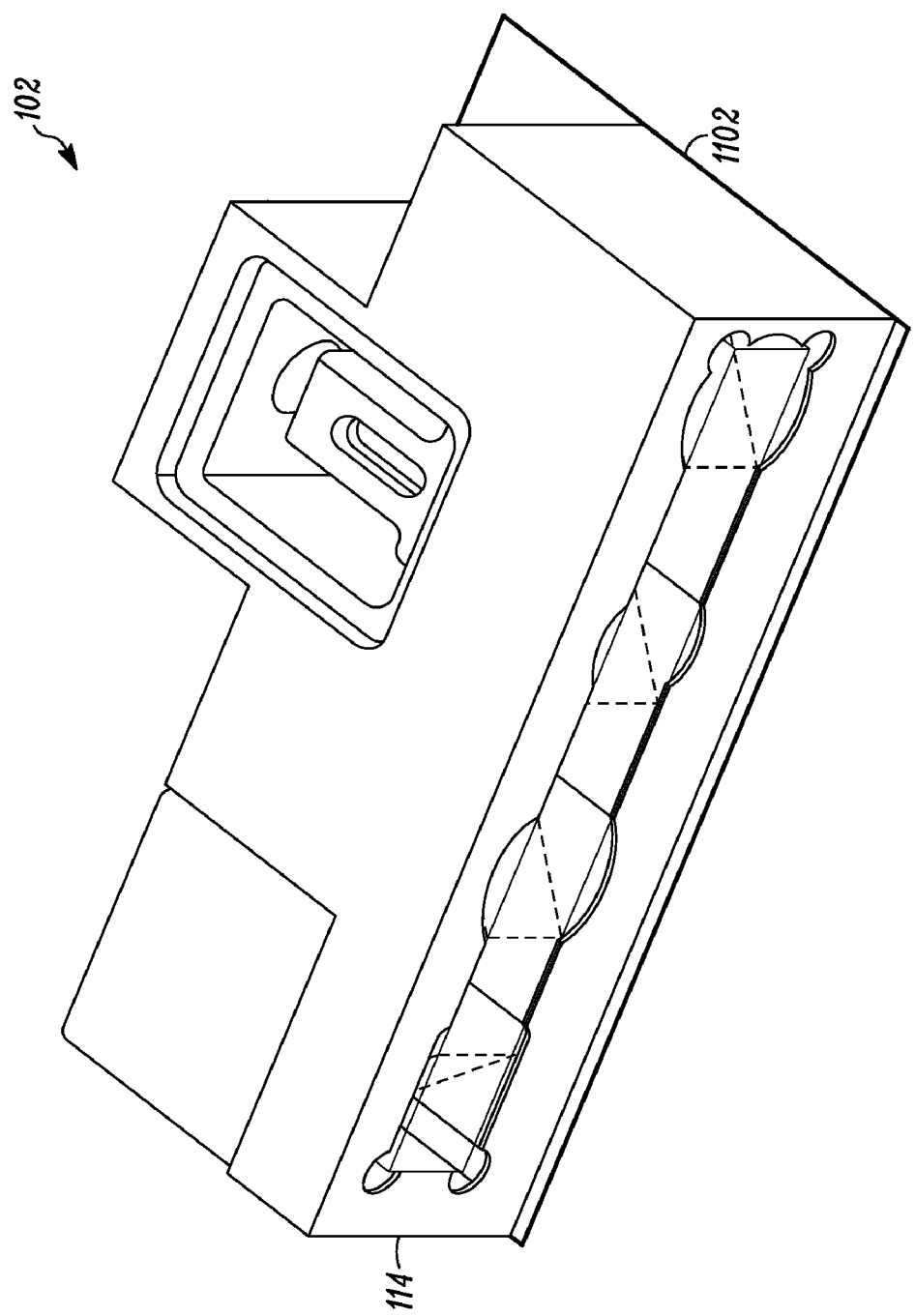
FIG. 11 is a perspective view of at least a portion of an integrated photonics module including a mechanically-coupled circuit board according to an embodiment.

FIG. 11 is a perspective view of at least a portion of an integrated photonics module including a mechanically-coupled circuit board 1102 according to an embodiment. The circuit board 1102 may optionally form a structural portion of the integrated optical engine portion 114 of the integrated photonics module 102. According to various embodiments, the circuit board 1102 may contain one or more of sensors, light source drivers, scanner controller, video controller electronics, and memory. As described above, the various sensors, light source drivers, scanner controller, video controller electronics, and memory may take many forms including but not limited to a conventional microprocessor or microcontroller and associated components, a single integrated ASIC, two or more ASICs, two or more ASICs plus one or more microprocessors such as DSPs or conventional CISC or RISC microprocessors, memory such as video memory ICs, other integrated components, discrete components, and software. In addition, a media module operable to convert a video signal into a preferred format may be integrated into the controller and onto the circuit board 1102. The MEMS scanner 120 and the light sources 116 may be interfaced directly to the circuit board 1102.

Figure 12:
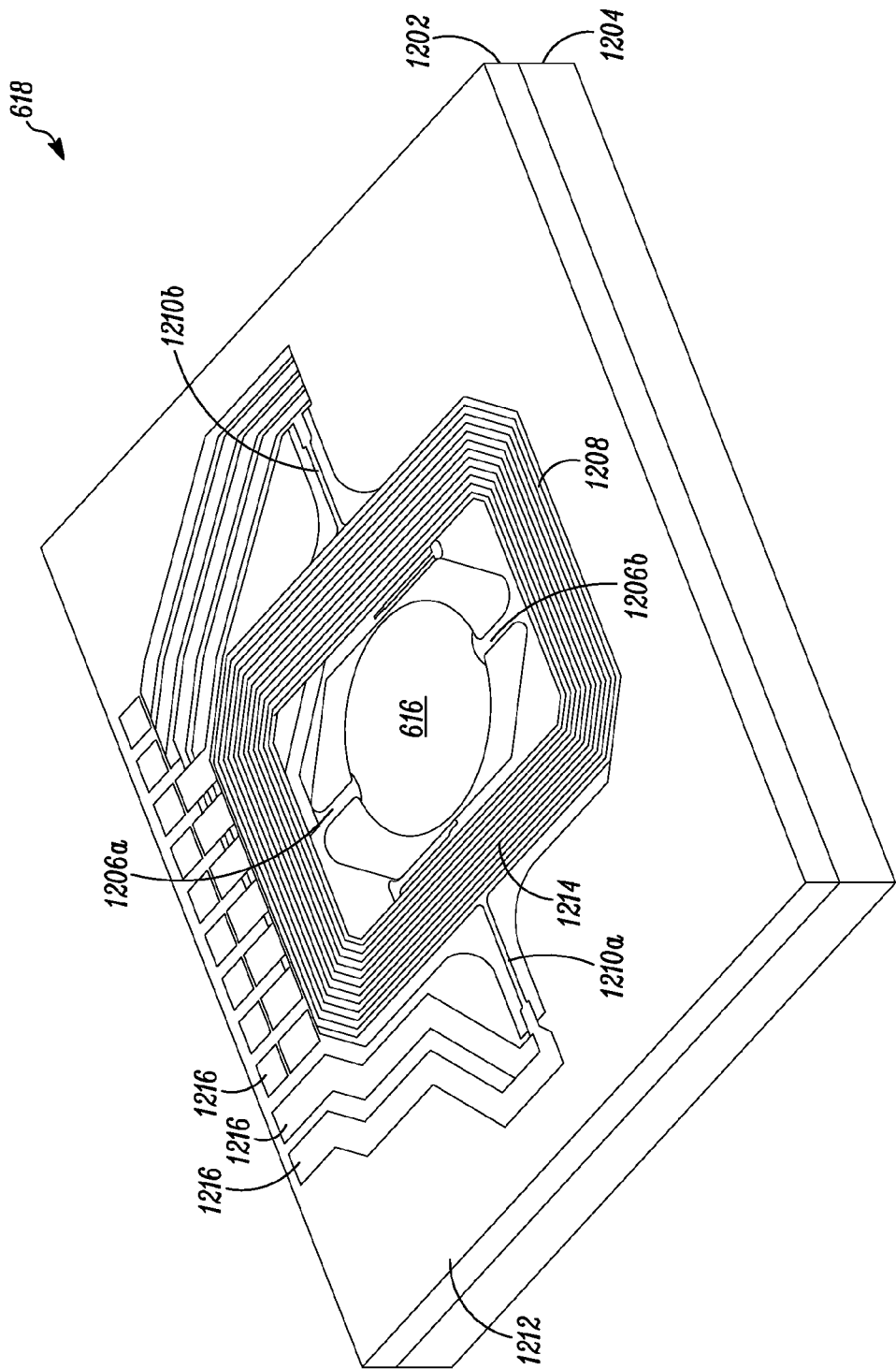
FIG. 12 is a perspective view of a MEMS scanner that may be used in the integrated photonics module of FIGS. 2-8 according to an embodiment.

FIG. 12 is a perspective view of a micro-electro-mechanical system (MEMS) scanner 618 that may be used to scan a beam of light in an integrated photonics module according to an embodiment. The MEMS scanner 618 may be formed from a layer of a single-crystal silicon wafer 1202 and a layer of a wafer of a dielectric material such as pyrex glass 1204, the wafers hermetically joined according to conventional silicon-on-insulator (SOI) technology. The layers may be partially- and through-etched to form a bulk micromachined MEMS scanner using techniques such as potassium hydroxide (KOH) etching, deep reactive ion etching (DRIE), combinations thereof, etc. According to one embodiment, the torsional hinges and mirror scan plate (described below) are partially etched to form thinned structures tuned to provide desired resonance frequencies, energy storage, mass, spring constant, etc.

The MEMS scanner 618 includes a scanning mirror 616 formed from a reflective metal or dielectric quarter-wave stack on a scan plate. The mirror and scan plate may be suspended on torsional fast-scan hinges 1206a and 1206 from a gimbal ring 1208. The torsional fast-scan hinges 1206a and 1206b are operable to allow rotation of the mirror 606 relative to the gimbal ring 1208 around an axis defined by their centerlines. The gimbal ring is, in turn, suspended on torsional slow-scan hinges 1210a and 1210b from a mounting frame 1212. The torsional slow-scan hinges 1210a and 1210b are operable to allow rotation of the gimbal ring and mirror relative to the mounting frame 1212 around an axis defined by their centerlines. An actuator comprising an electromagnetic coil 1214 is formed on the gimbal ring for driving rotation around the slow-scan and fast-scan axes. A signal containing a composite of slow-scan and fast-scan waveform may be received from the MEMS controller via a MEMS amplifier (not shown) via leads 1216 (and interface cable 622, not shown). The actuator 1214 forms a composite periodic magnetic field that pushes and pulls against an external magnetic field formed by scanner magnets 620 (not shown, but visible in Figures above).

Because the gimbal ring 1208 is directly driven, the slow scan drive may provide an arbitrary drive waveform selected to exclude frequencies that may excite the fast scan. According to an embodiment, the slow scan waveform may approximate a sawtooth wave or an asymmetric triangle wave at a periodic frequency corresponding to a frame rate such as 60 Hz. The sawtooth slow scan waveform may thus be operable to provide a vertical frame scan with retrace through a desired angle.

The fast scan drive signal includes a periodic waveform, such as a sine wave for example, selected to correspond to a resonance frequency of the mirror and scan plate 616. Slight asymmetries in the system are operable to transmit minute fluctuations in the motion of the gimbal ring 1208 at the fast-scan frequency to the mirror 616 via the fast-scan flexures 1206a and 1206b. The minute fluctuations in motion are amplified through resonance to provide a desired fast-scan angle.

The MEMS scanner 618 may further include various sensors to provide feedback to the MEMS controller. These may include piezo-resistor (PZR) strain sensors in the torsional hinges, temperature junctions or thermistors, etc. According to an embodiment, the mirror and scan plate 616 have a diameter of about 1.2 mm, sufficient to receive the composite input beam without beam clipping.

The MEMS scanner 618 is shown with its scan plate and the scanning mirror 616 formed thereon at one un-powered or "rest" position. According to embodiments, the mirror may be tilted at a powered rest position in the slow-scan axis by applying a DC bias to the actuator. The DC bias may apply a nominal "tilt" to the gimbal ring 1208 about the slow scan axis define by the slow scan torsional hinges 1210a, 1210b. Alternative embodiments of MEMS scanners may be operable to create a powered rest plane of the mirror 616 in both axes. For example, a MEMS scanner may be formed with actuators 1214 formed on the scan plate. A DC bias in an actuators on the scan plate may be operable to apply a nominal tilt to the mirror 616 about the fast scan axis defined by the torsional hinges 1206a, 1206b, in addition to the actuator 1214 on the gimbal ring 1208 providing a rest tilt relative to the slow scan axis.

Such a nominal tilt in rest position may be used, for example, to more precisely align the mirror 616 to the integrated optical assembly (not shown).

Figure 13:
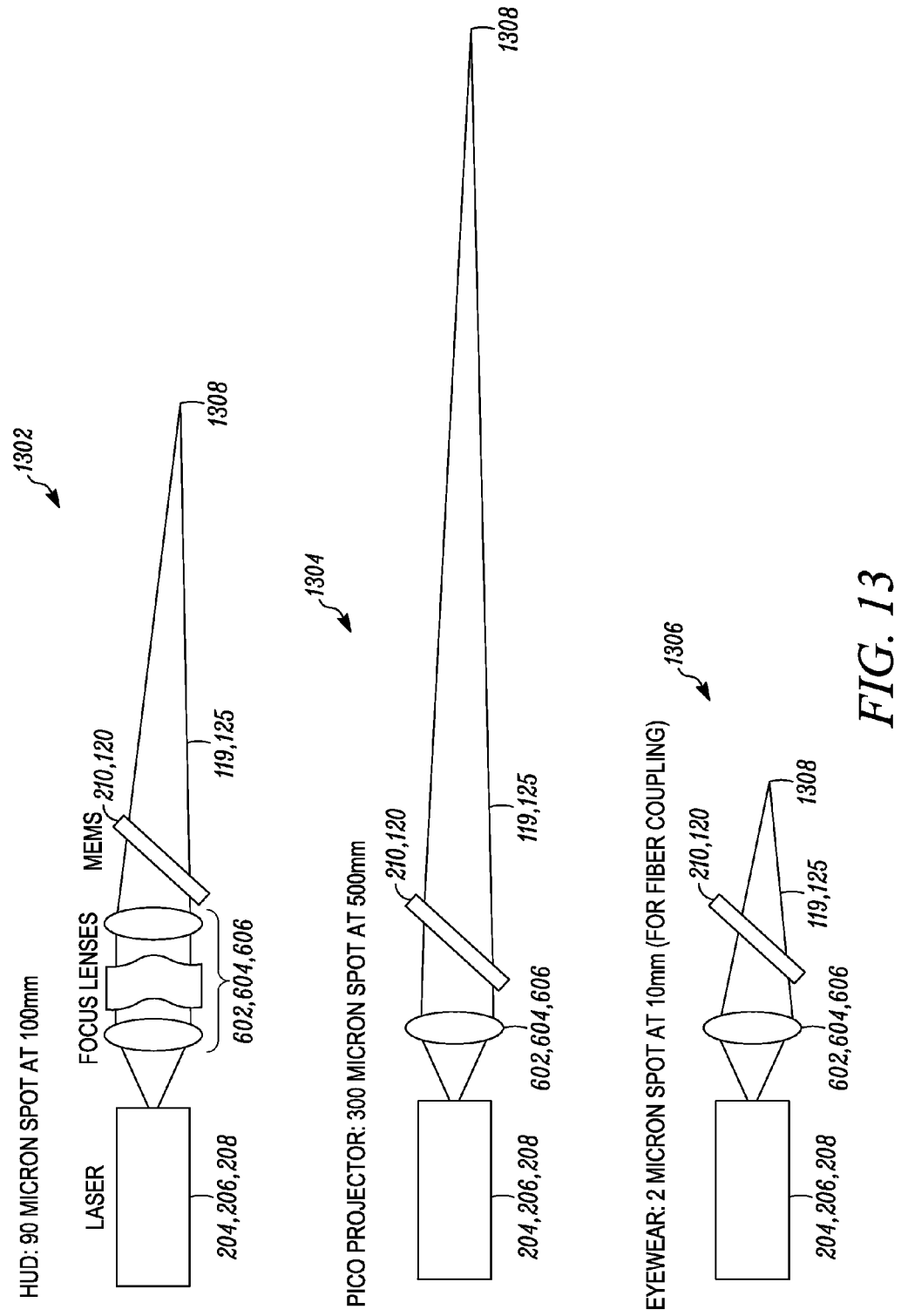
FIG. 13 is a diagram illustrating exemplary beam shapes and beam shaping optics for three applications for integrated photonics modules according to embodiments.

FIG. 13 is a diagram illustrating exemplary beam shapes 119, 125 and beam shaping optics 602, 604, 606 for three configurations 1302, 1304, 1306 corresponding to three applications for an integrated photonics module according to embodiments.

According to a first configuration 1302 corresponding to a heads-up-display, the beam 119, 125 may be focused to a waist 1308 at a distance approximately 100 mm from the output face 212 (not shown) of the integrated photonics module. According to various embodiments, the emitted beams from a plurality of light sources 204, 206, 208 may be combined by a beam combiner 210 into a modulated composite beam, and the modulated composite beam scanned by a beam scanner 120 as a scanned modulated beam 125, as indicated by the diagram. The exemplary distance of 100 mm may correspond to the distance to an exit pupil expander (not shown). In such applications, the exit pupil expander may typically be inserted prior to final optics 126 (not shown) to provide an expanded exit pupil or eye-box in which an image may be projected onto a viewer's retina.

According to a second configuration 1304 corresponding to a portable scanned beam video projector, the beam 119, 125 may be focused to a waist 1308 at a distance approximately 500 mm from the output face 212 (not shown) of the integrated photonics module. According to various embodiments, the emitted beams from a plurality of light sources 204, 206, 208 may be combined by a beam combiner 210 into a modulated composite beam, and the modulated composite beam scanned by a beam scanner 120 as a scanned modulated beam 125. According to various embodiments, final optics 126 may be placed in the beam path as indicated by the diagram. The exemplary distance of 500 mm may correspond to a nominal working distance from a projection surface.

According to a third configuration 1306 corresponding to a head-worn scanned beam or retinal display, the beam 119 may be focused to a waist 1308 at a distance approximately 10 mm from the output face 212 (not shown) of the integrated photonics module. According to various embodiments, the emitted beams from a plurality of light sources 204, 206, 208 may be combined by a beam combiner 210 into a modulated composite beam 119, and the modulated composite beam launched into an optical fiber for transmission to the head-worn portion of the display. The exemplary distance of 10 mm may correspond to a distance between the output face of the integrated photonics module and the fiber optic input coupler. According to various embodiments, the optical fiber, which may be a single mode optical fiber, conveys the modulated composite beam 119 to a distal end near the eye of a viewer. The light may typically exit the distal end of the optical fiber at a divergence angle that substantially corresponds to the convergence angle made by the beam at the input or proximal end. The light that exits the distal end of the optical fiber (not shown) may be focused to a distance corresponding to the distance to the viewers eye, scanned in a periodic pattern by a beam scanner mounted distally (not shown), and relayed to the viewer's eye by final optics (not shown).

One general observation that may be drawn from the diagrams of FIG. 13 is that an integrated photonics module may be adapted to operate in a variety of applications. Additionally or alternatively, variants of an integrated photonics module design may be adapted to a variety of applications, some of which are indicated in FIG. 13. FIGS. 14-18 and other description herein, literal and inherent, illustrate some approaches to providing an integrated photonics module having commonality or commonality of design across a range of applications.

Figure 14:
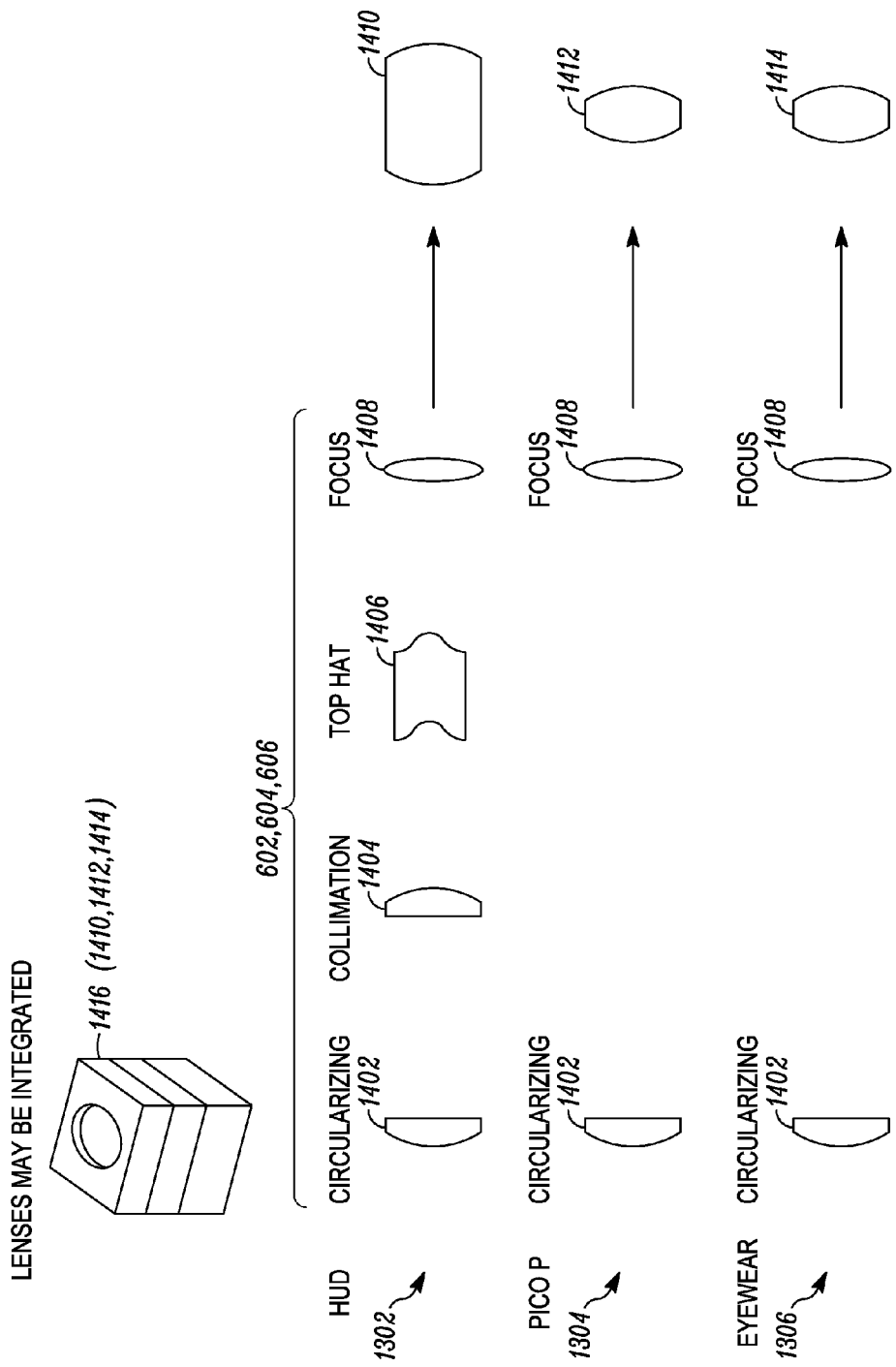
FIG. 14 is a diagram illustrating discrete and integrated variants of beam shaping optics for an integrated photonics module according to embodiments.

FIG. 14 is a diagram illustrating discrete and integrated variants of beam shaping optics for an integrated photonics module according to embodiments. A heads-up display application 1302 may, according to an embodiment, use some or all of a circularizing lens 1402, a collimation lens 1404, a top hat lens 1406, and a focus lens 1408 to shape its beam. The optional circularizing lens 1402 may provide astigmatic correction to convert the output of many lasers, which may have different divergences in each of two axes, to a radially symmetric beam with substantially equal divergence in any axis. Such a lens may provide circularization with minimal loss of optical power. Additionally or alternatively, a clipping aperture may be used in the system. A collimating lens 1404 provides a beam shape with substantially parallel sides for introduction to a top hat lens 1406. The top hat lens 1406 converts the Gaussian energy distribution of the input beam to an output beam with a top hat shape having substantially equal power across its cross section. A focus lens 1408 focuses the beam to a working distance as indicated above.

Top hat beams convolve through a sinc-shaped energy distribution before convolving back to a top hat energy distribution. Accordingly, it may be desirable to select a focal length for the top hat lens 1406 to produce a convolved top hat function at a viewing distance. The focal length of the focus lens 1408 may be selected to produce a waist at an EPE, which may for example be an ordered micro-lens array (MLA). The EPE produces beamlets in the far field to provide an expanded region over which the video image may be received by the viewer's retina. By selecting a top hat shaped composite scanned beam, the beamlets produced by the EPE may also be top hat shaped (after convolution through a sinc energy distribution) within the range of desired viewing distances. The top hat shaped beamlets "tile" with one another and reduce or eliminate visible variations in power across the eye-box.

As may be seen in the HUD application 1302 represented by the top diagram in FIG. 14, the circularizing, collimation, top hat, and focus lenses 1402, 1404, 1406, and 1408 may be combined into one or more integrated lenses 1410.

A portable projector application 1304 may, according to an embodiment, use some or all of a circularizing lens 1402 and a focus lens 1408 to shape its beam. As with the HUD application 1302, the optional circularizing lens 1402 may provide astigmatic correction to convert the output of many lasers, which may have different divergences in each of two axes, to a radially symmetric beam with substantially equal divergence in any axis. Such a lens may provide circularization with minimal loss of optical power. Additionally or alternatively, a clipping aperture may be used in the system. A focus lens 1408 focuses the beam to a working distance as indicated above. Optionally, other lenses such as collimation and top hat lenses may also be used in portable projector embodiments.

As may be seen in the portable projector application 1304 represented by the middle diagram in FIG. 14, the circularizing and focus lenses 1402 and 1408 may be combined into one or more integrated lenses 1412.

A head mounted display application 1306 may, according to an embodiment, use some or all of a circularizing lens 1402 and a focus lens 1408 to shape its beam. As with the HUD and portable projector applications 1302 and 1304, the optional circularizing lens 1402 may provide astigmatic correction to convert the output of many lasers, which may have different divergences in each of two axes, to a radially symmetric beam with substantially equal divergence in any axis. Such a lens may provide circularization with minimal loss of optical power. Additionally or alternatively, a clipping aperture may be used in the system. A focus lens 1408 focuses the beam to a working distance as indicated above. Optionally, other lenses such as collimation and top hat lenses may also be used in head mounted display embodiments.

As may be seen in the head mounted display application 1306 represented by the bottom diagram in FIG. 14, the circularizing and focus lenses 1402 and 1408 may be combined into one or more integrated lenses 1414.

The integrated lens 1416 is representative of a physical embodiment of the integrated lenses 1410, 1412, and 1414 described above.

FIGS. 15-17 are indicative of an approach for providing at least a common portion in an integrated photonics module that may be used in a variety of applications by distributing the beam shaping function across a plurality of optical elements. FIG. 15 is a diagram illustrating a portion of an integrated photonics module for a portable scanned beam projector 1502 according to an embodiment. The beams from the light sources 116 are shaped by the beam shaping optics 602, 604, and 606, and combined by the beam combiner 210 to form a modulated composite beam 119 as described above.

FIG. 16 is a diagram illustrating the use of the integrated photonics module portion for a portable projector 1502 of FIG. 15 to provide a portion of an integrated photonics module for a HUD 1602 having differing beam shape requirements as indicated especially by FIG. 13, according to an embodiment. As shown in FIG. 16, the integrated photonics module portion 1502 may be combined with a composite beam shaping optical assembly 1604. According to the illustrative embodiment, the integrated photonics module portion 1502 is operable to provide a modulated composite beam having characteristics appropriate for a portable scanned beam video projector, for example having a beam with a waist distance of about 500 mm, as illustrated by FIG. 13. The beam may then be introduced to a series of lenses including a collimation lens 1404, a top hat lens 1406, and color-balanced focusing optics 1606. The series of lenses 1404, 1406, and 1606, referred to in combination as an optical assembly 1604 is configured to convert the beam from a shape appropriate for a portable scanned beam video projector to a shape appropriate for a HUD, for example one having a top hat power distribution and a focus distance of 100 mm.

FIG. 17 is a diagram illustrates the integration of the optical assembly 1604 into a composite lens 1704 to form an integrated photonics module portion 1702 for a HUD according to an embodiment.

Figure 18:
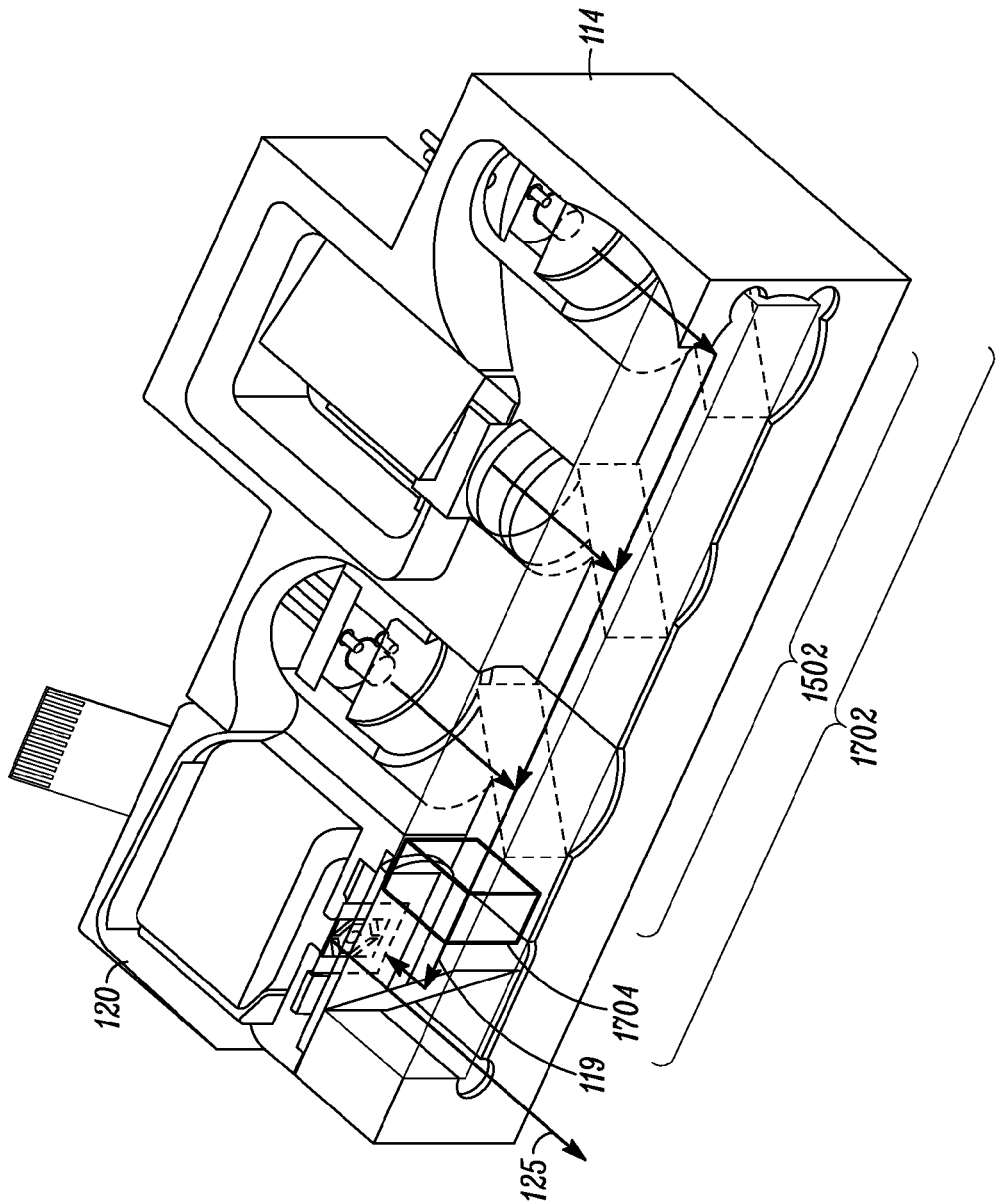
FIG. 18 is a perspective view of at least a portion of an integrated photonics module showing light transmission paths and the placement of optional adaptor optics according to an embodiment.

FIG. 18 is a perspective view of at least a portion of an integrated photonics module 114 showing light transmission paths and the placement of optional adaptor optics according to an embodiment. The integrated photonics module 114 includes a portion 1502 configured for a portable scanned beam video projector and an adaptor optic 1704 configured to receive the modulated composite beam from the portion 1502 and produce a modulated composite beam 119 having different characteristics. According to the embodiment, the portion 1502 and the adaptor optic 1704 comprise a portion of an integrated photonics module 1702 configured for a heads-up display. As described above the modulated composite beam is scanned in a periodic pattern by the scanner 120 to form the modulated scanned beam 125 that is operable, in this example, to provide a video image to the operator of a vehicle equipped with a HUD comprising the integrated photonics module including the module 114.

Figure 19:
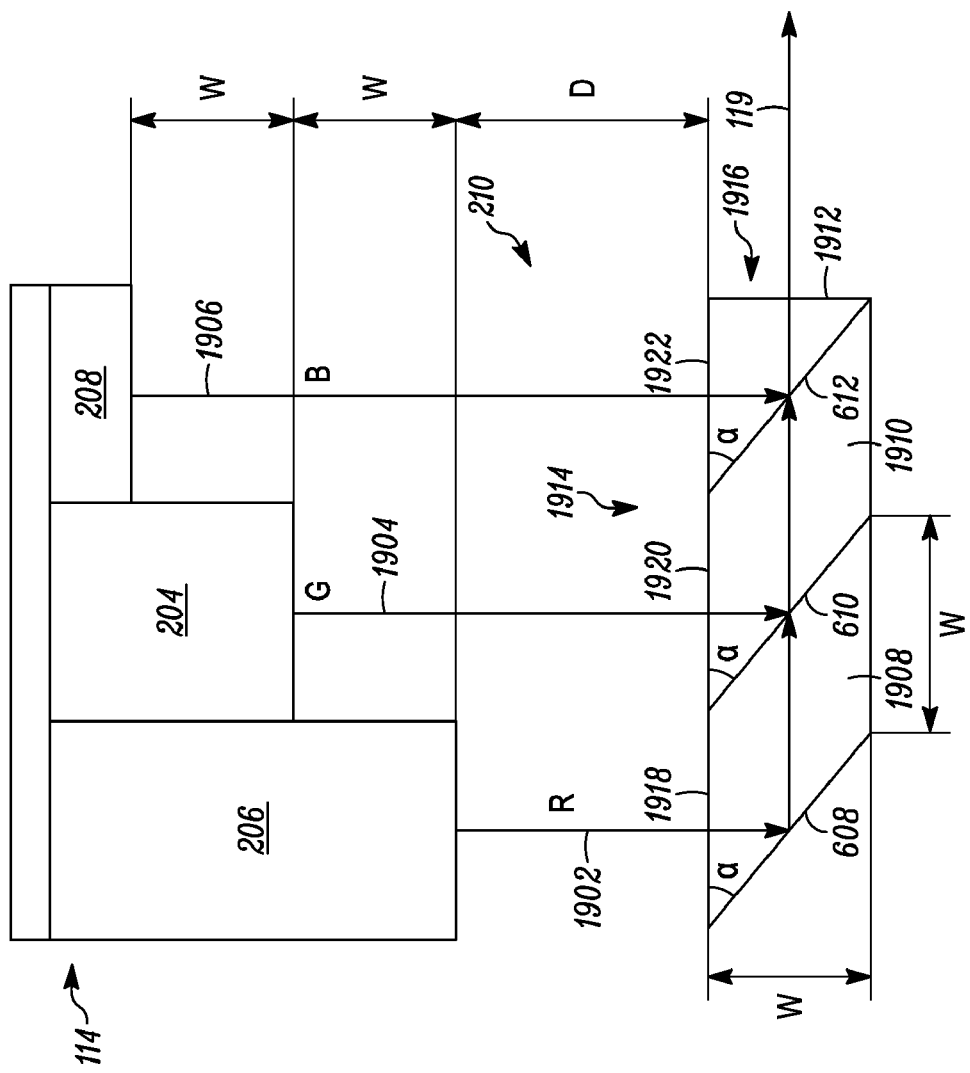
FIG. 19 is a diagram illustrating the relationship of the light sources and the beam combiner of at least a portion of an integrated photonics module according to an embodiment.

FIG. 19 is a diagram illustrating the relationship of the light sources 204, 206, and 208 and the beam combiner 210 of at least a portion of an integrated photonics module according to an embodiment. FIG. 19 includes a side view of a beam combiner 210 for combining separate R, G, and B light beams 1902, 1904, and 1906 into a single, composite light beam 119, and a diagram of an RGB beam source 114 according to an embodiment.

The beam combiner 210 includes three sections 1908, 1910, and 1912, which are bonded together and which are made from a transparent material such as glass or polymer suitable for optical applications. The combiner 210 also includes an input face 1914 having a length of 3W and a rectangular cross section in the X-Z plane, and includes an output face 1916 having a height of W and a square cross section in the Y-Z plane. In one embodiment, W=5.5 millimeters (mm), and in another embodiment W=3.5 mm. Both the input face 1914 and the output face 1916 are flat, optical-quality surfaces. The manufacture of the combiner 210 is discussed U.S. patent application Ser. No. 10/828,876, entitled APPARATUS AND METHOD FOR COMBINING MULTIPLE ELECTROMAGNETIC BEAMS INTO A COMPOSITE BEAM, commonly assigned herewith and incorporated by reference herein.

The first section 1908 has a parallelogram-shaped cross section in the X-Y plane with a height and width of W and includes a segment input face 1918, which forms part of the combiner input face 1914, and a reflector face 608 for reflecting the R beam 1902 toward the combiner output face 1916. In one embodiment, the face 608 is made reflective by application of a conventional optical coating. One can select the reflective and transmissive properties of this coating (and the other coatings discussed below) according to the parameters of the beam-combiner system. The angle $\alpha$ between the input face 1918 and the reflector face 608 is an acute angle. In a preferred embodiment, $\alpha=45°$ to allow the R beam 1902 to have a maximum width in the X dimension equal to W. That is, if $\alpha=45°$, then all portions of a W-width R beam will project onto the reflector face 608 as long as the R beam is properly aligned with the input face 1918. If, however, the combiner 210 is designed for an R beam 1902 having a width less than W, then the region of the face 608 that is reflective can be limited to the area that the R beam will strike. Alternatively the angle $\alpha$ can be made greater than 45°. But because the angle $\alpha$ is the same for all of the segments 1908, 1910, and 1912, one should consider the effect on the other segments 1910 and 1912 before altering the value of $\alpha$. Furthermore, if a does not equal 45°, then the angle of the R beam from the beam source 114 is adjusted such that the reflected R beam remains normal to the output face 1916.

Similarly, the second section 1910 has a parallelogram-shaped cross section in the X-Y plane with a height and width of W and includes a segment input face 1920, which forms part of the combiner input face 1914, and includes a reflector face 610, which lies along an interface between the sections 1908 and 1910 and passes the reflected R beam 1902 and reflects the G beam 1904 toward the combiner output face 1916. In one embodiment, the face 610 is made reflective by application of a conventional optical coating to either or both the face 610 and the face of the section 1908 that interfaces with the face 610. The angle $\alpha$ between the input face 1920 and the reflector face 610 is an acute angle, and is preferably equal to 45° to allow the G beam 1904 to have a maximum width in the W dimension equal to W. If, however, the combiner 210 is designed for a G beam 1904 having a width less than W, then the region of the face 610 that is reflective can be limited to the area that the G beam will strike. Alternatively the angle α can be made greater than 45°. But because the angle α is the same for all of the segments 1908, 1910, and 1912, one should consider the effect on the other segments 1908 and 1912 before altering the value of α. Furthermore, if α does not equal 45°, then the angle of the G beam from the beam source 114 is adjusted such that the reflected G beam remains normal to the output face 1916.

The third section 1912 has a triangular-shaped cross section in the X-Y plane and includes the combiner output face 1916, a segment input face 1922, which has a width of W and which forms part of the combiner input face 1914, and a reflector face 612, which lies along an interface between the sections 1910 and 1912 and passes the reflected R and G beams 1902 and 1904 and reflects the B beam 1906 toward the combiner output face. In one embodiment, the face 612 is made reflective by application of a conventional optical coating to either or both the face 612 and the face of the section 1910 that interfaces with the face 612. The angle α between the input face 1922 and the reflector face 612 is an acute angle, and is preferably equal to 45° to allow the B beam 1906 to have a maximum width in the X-dimension equal to W. If, however, the combiner 210 is designed for a B beam 1906 having a width less than W, then the region of the face 612 that is reflective can be limited to the area that the B beam will strike. Alternatively the angle α can be made greater than 45°. But because the angle α is the same for all of the segments 1908, 1910, and 1912, one should consider the effect on the other segments 1908 and 1910 before altering the value of α. Furthermore, if α does not equal 45°, then the angle of the B beam from the beam source 114 is adjusted such that the reflected B beam is normal to the output face 1916. Moreover, an angle β between the section input face 1922 and the output face 1916 is substantially a right angle in a preferred embodiment.

Figure 20:
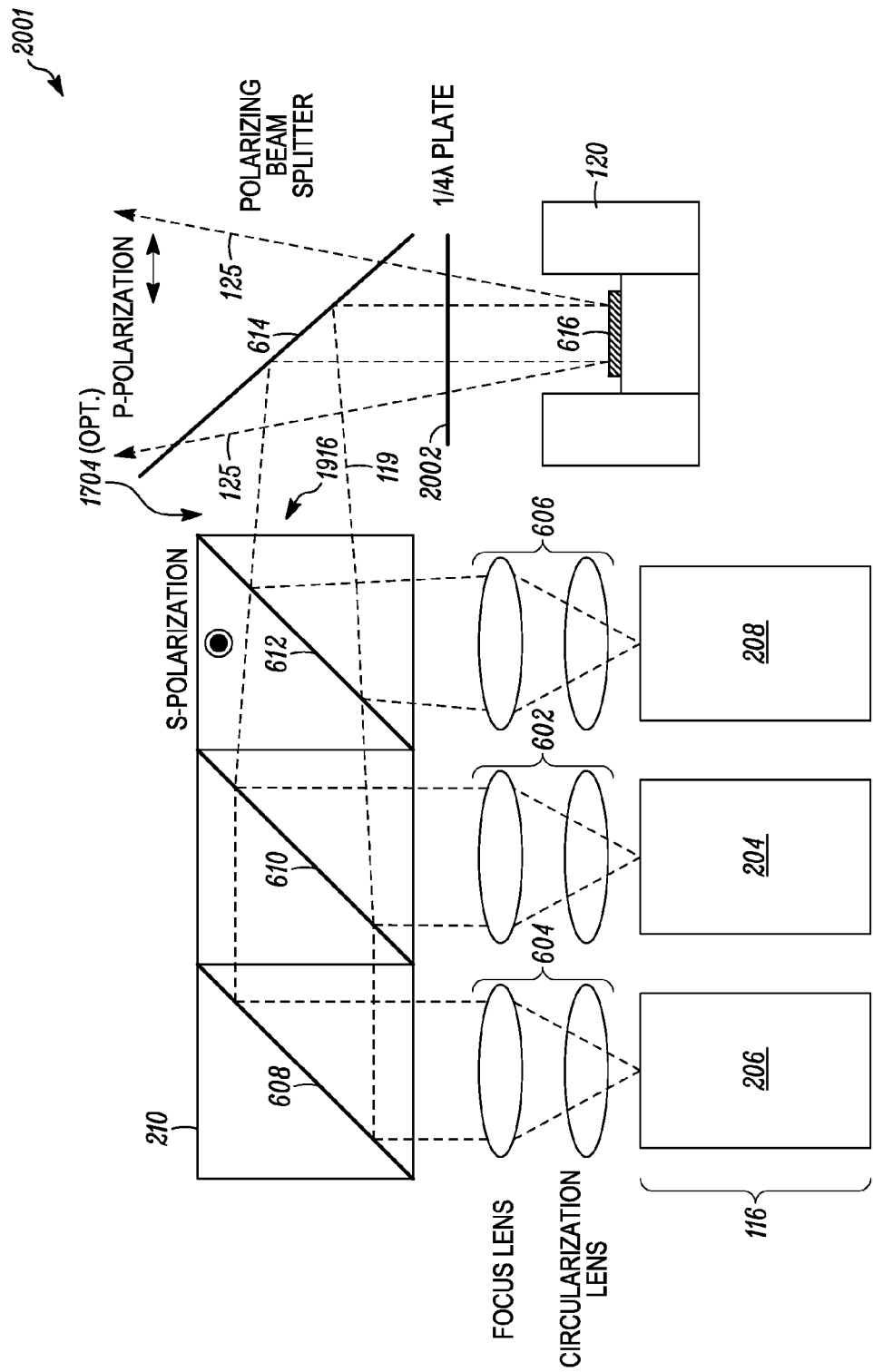
FIG. 20 is a diagram illustrating light transmission in at least a portion of an integrated photonics module according to an embodiment.

FIG. 20 is a diagram illustrating light transmission in at least a portion of an integrated photonics module according to an embodiment 2001. Light sources 116, which may include three light sources 204, 206, and 208, are configured to launch beams of modulated light through their respective beam shaping optics 602, 604 and 606 toward a beam combiner 210. The light sources may be configured to emit polarized beams of light. Alternatively, the beam shaping optics 602, 604, and/or 606 may include polarizers configured to provide S-polarized light to the beam combiner 210 as shown. Optionally, the mirrors 608, 610, and 612 may be configured to combine the S-polarized components of the input beams and pass the P-polarized components toward a light trap (not shown). The respective mirrors 608, 610, and 612 of the beam combiner combine the beams of modulated light from the emitters 206, 204, and 208 into a modulated composite beam 119 of S-polarized light. Adaptor optics 1704 may optionally be inserted into the beam path to receive light from the output face 1916 of the beam combiner.

A selective fold mirror 614 comprising a polarizing beam splitter directs the modulated composite beam 119 toward the mirror 616 of a scanner 120. The selective fold mirror 614 may be aligned to launch the composite beam toward the scan mirror 616 from a direction substantially normal to the nominal mirror (center crossing) position. Such an arrangement may be useful to minimize geometric distortion in the scanned beam.

As an alternative to providing S-polarized light in the beam combiner 210, some or all of the polarization of the beam may be provided by the polarizing beam splitter 614, the polarizing beam splitter being operative to direct the S-polarization component of the modulated composite beam 119 toward the scan mirror 616 and pass the P-component of the light toward a light trap (not shown).

The polarizing beam splitter 614 is configured to preferentially reflect S-polarized light and thus reflects S-polarized light toward the scanner 120. The S-polarized modulated composite beam passes through a polarization rotator 2002 on its path toward the scan mirror 616. The polarization rotator may be configured as a quarter-wave plate operative to convert the S-polarized light to circularly polarized light before it impinges upon the scan mirror 616. As described above, the scanner 120 is operable to scan the beam in a periodic pattern across a field of view to produce a scanned modulated beam of light 125. After being reflected (and scanned) by the scanner mirror 616, the scanned beam again passes through the polarization rotator 2002. The polarization rotator converts the now circularly-polarized beam from the scan mirror to P-polarized light.

The P-polarized light propagates toward the polarizing beam splitter 614. The polarizing beam splitter 614 is configured to preferentially pass P-polarized light and thus allows the P-polarized scanned beam 125 to pass toward the FOV.

As an alternative to using polarized light, the system of FIG. 20 may use non-polarized or elliptically polarized light. In such an alternative embodiment, the fold mirror 614 may comprise a selective reflector such as a half-silvered mirror. A portion of the impinging beam 119 passes through the fold mirror 614, for example toward a light trap (not shown), and a portion of the light energy is directed toward the scanner mirror 616. The polarization rotator may be omitted in the alternative embodiment. The scanned beam 119 again impinges on the half-silvered mirror 614 and a portion of it passes through toward the FOV. The portion reflected may be reflected back toward the light sources and/or toward light traps.

Figure 21:
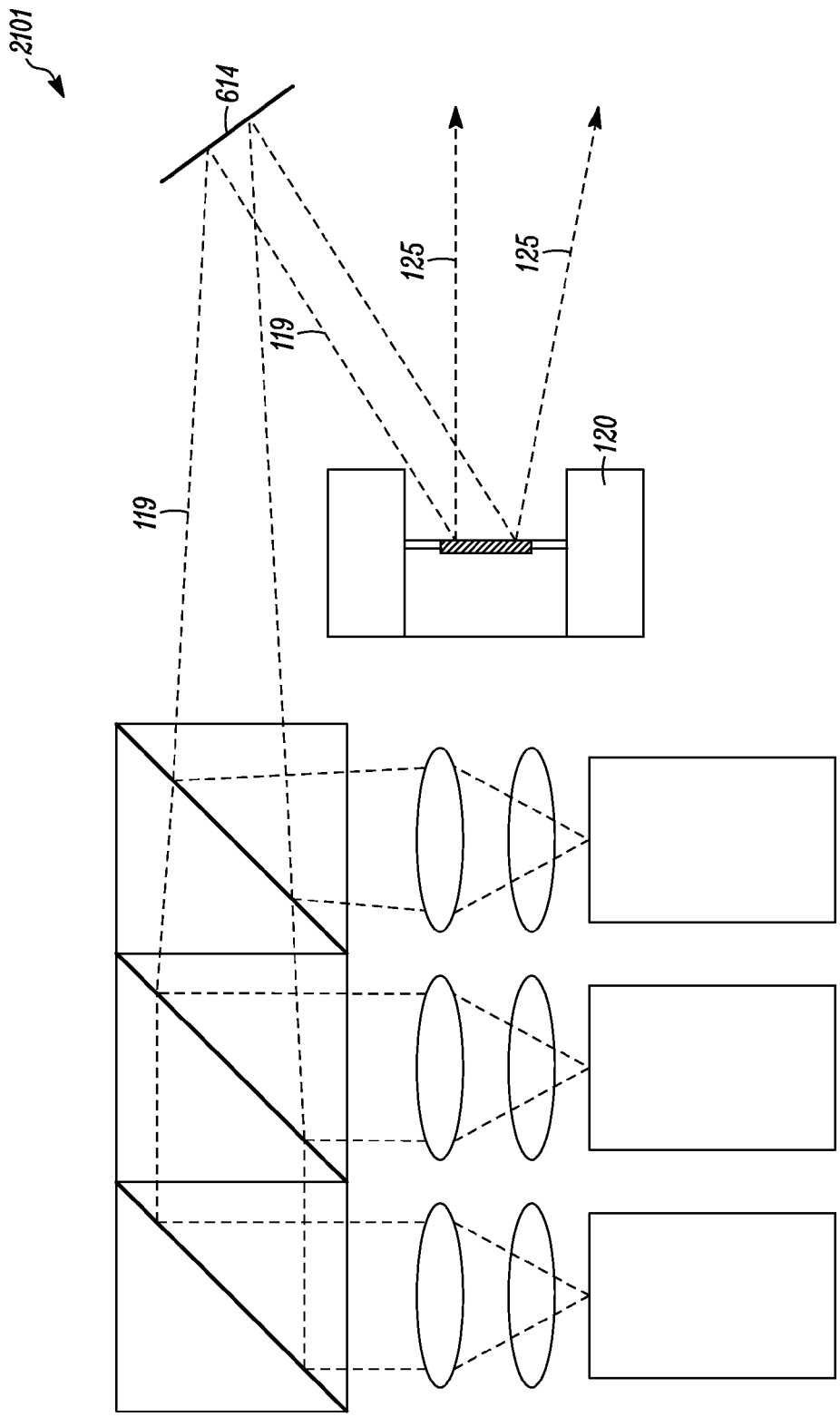
FIG. 21 is a diagram illustrating light transmission in at least a portion of an integrated photonics module according to another embodiment.

Several alternative embodiments to the configuration of FIG. 20 are possible. FIG. 21 is a diagram illustrating light transmission according to another embodiment 2101 that launches the composite beam 119 toward the scanner 120 at an oblique angle. The scanned beam 125 passes toward the FOV in a pattern that has some amount of keystone distortion compared to the approach of FIG. 20. According to some embodiments the modulated composite beam 119 need not be polarized and the fold mirror 614 need not be a selective reflector when the scanned beam does not pass through the fold mirror again.

Figure 22:
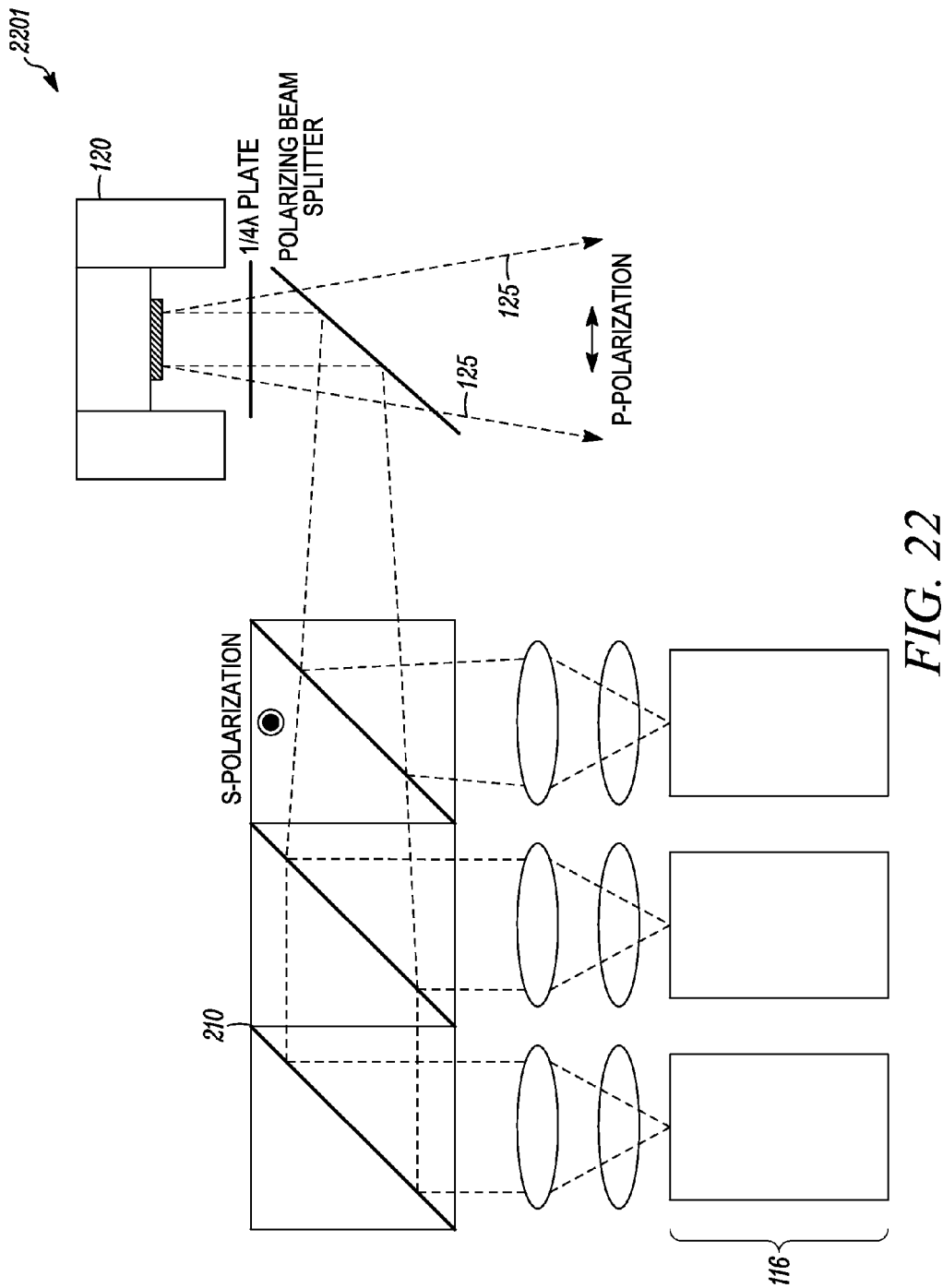
FIG. 22 is a diagram illustrating light transmission in at least a portion of an integrated photonics module according to another embodiment.

FIG. 22 illustrates an embodiment 2201 wherein the scanner 120 is configured to lie on the opposite side of the beam combiner from the light sources 116. The scanned beam of light thus passes toward the FOV in a direction "behind" the light sources 116.

Figure 23:
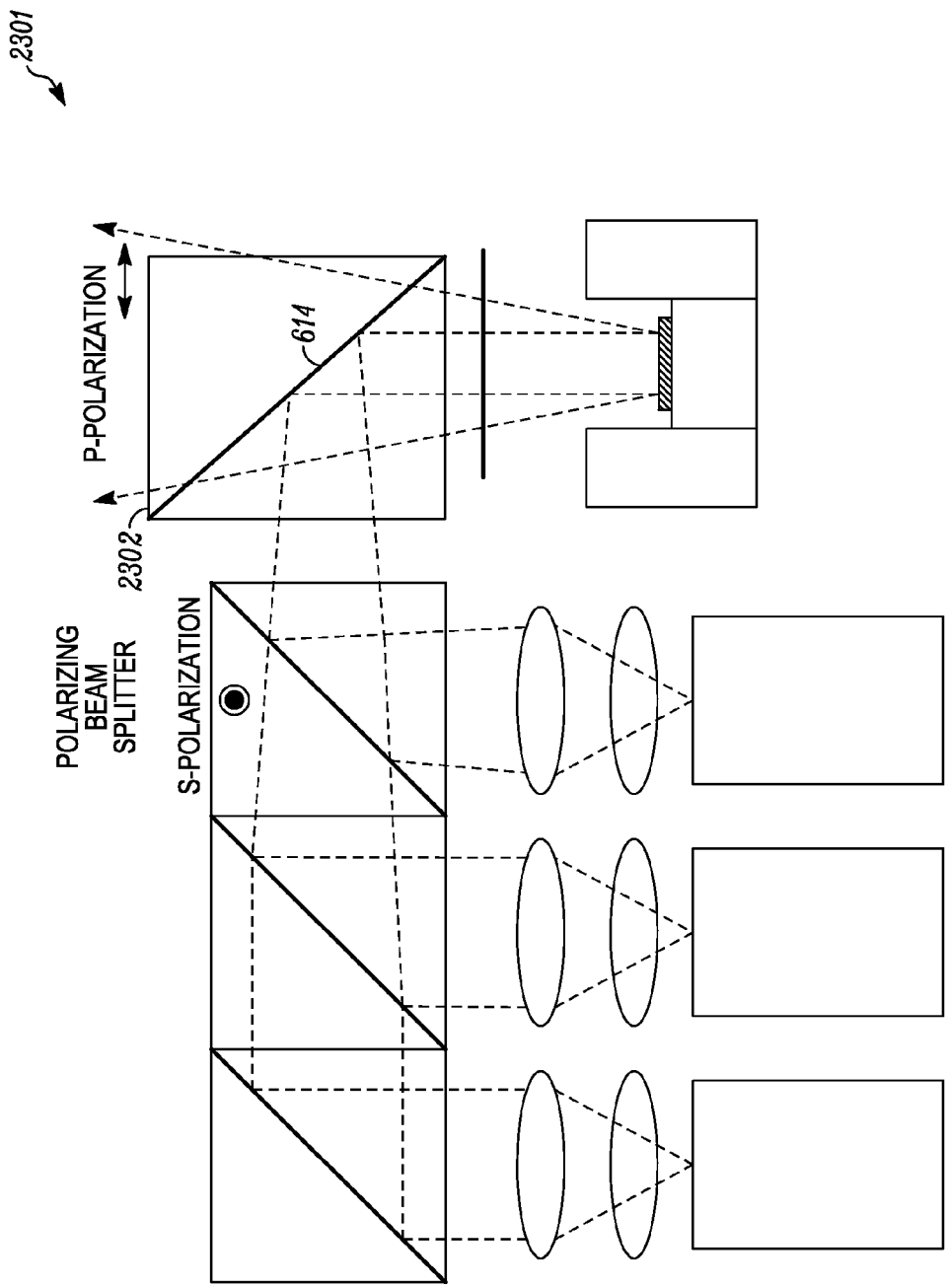
FIG. 23 is a diagram illustrating light transmission in at least a portion of an integrated photonics module according to another embodiment.

FIG. 23 is a diagram illustrating an embodiment 2301 wherein the fold mirror may comprise a polarizing beam splitter configured as a solid optic.

Figure 24:
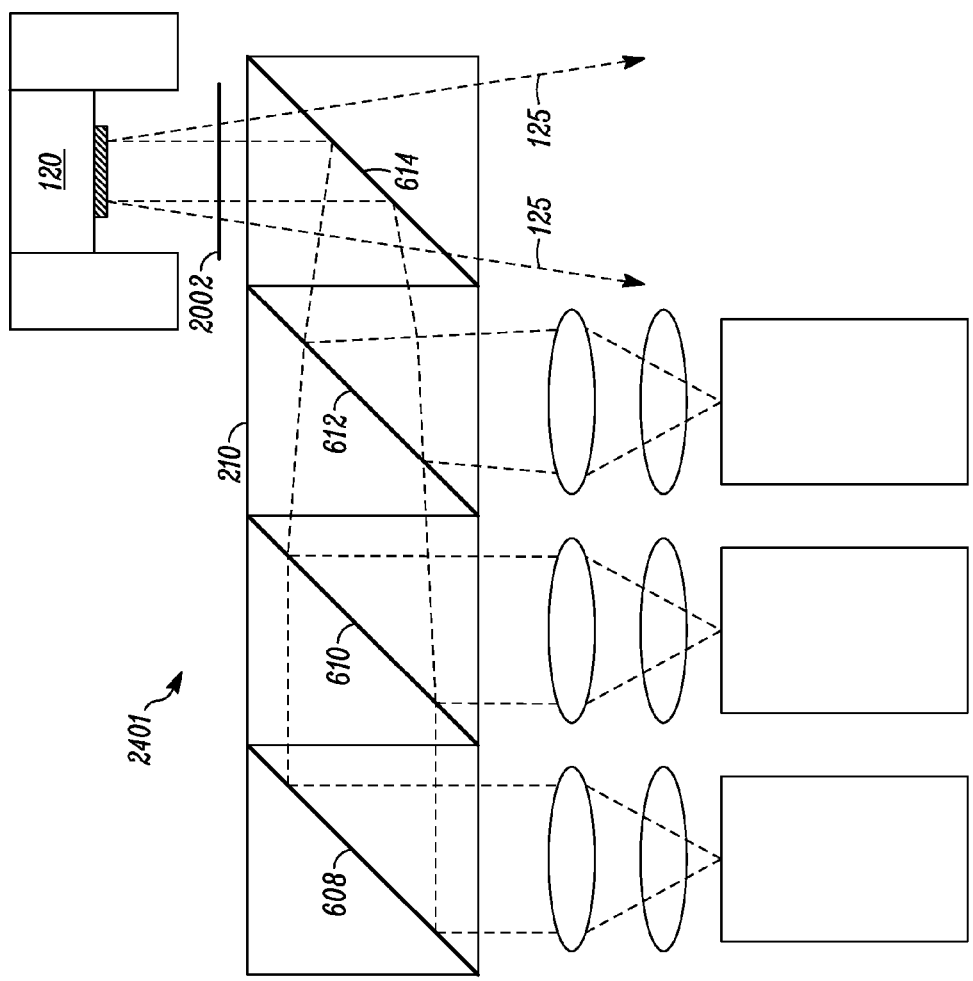
FIG. 24 is a diagram illustrating light transmission in at least a portion of an integrated photonics module according to another embodiment.

FIG. 24 is a diagram illustrating an embodiment 2401 wherein the fold mirror 614 is integrated into the beam combiner 210. The illustrated embodiment illustrates the fold mirror 614 as a polarizing beam splitter. As described above, the fold mirror reflects a first polarization of light toward the scanner 120. The polarization rotator 2002 is configured to rotate the polarization 90 degrees in a double-pass to and from the scanner 120, preferentially reflecting input energy toward the scanner and preferentially passing the scanned beam toward the FOV.

The embodiment 2401 uses a fold mirror 614 that is configured in a plane parallel to the plane of the beam combining mirrors 608, 610, and 612.

Figure 25A:
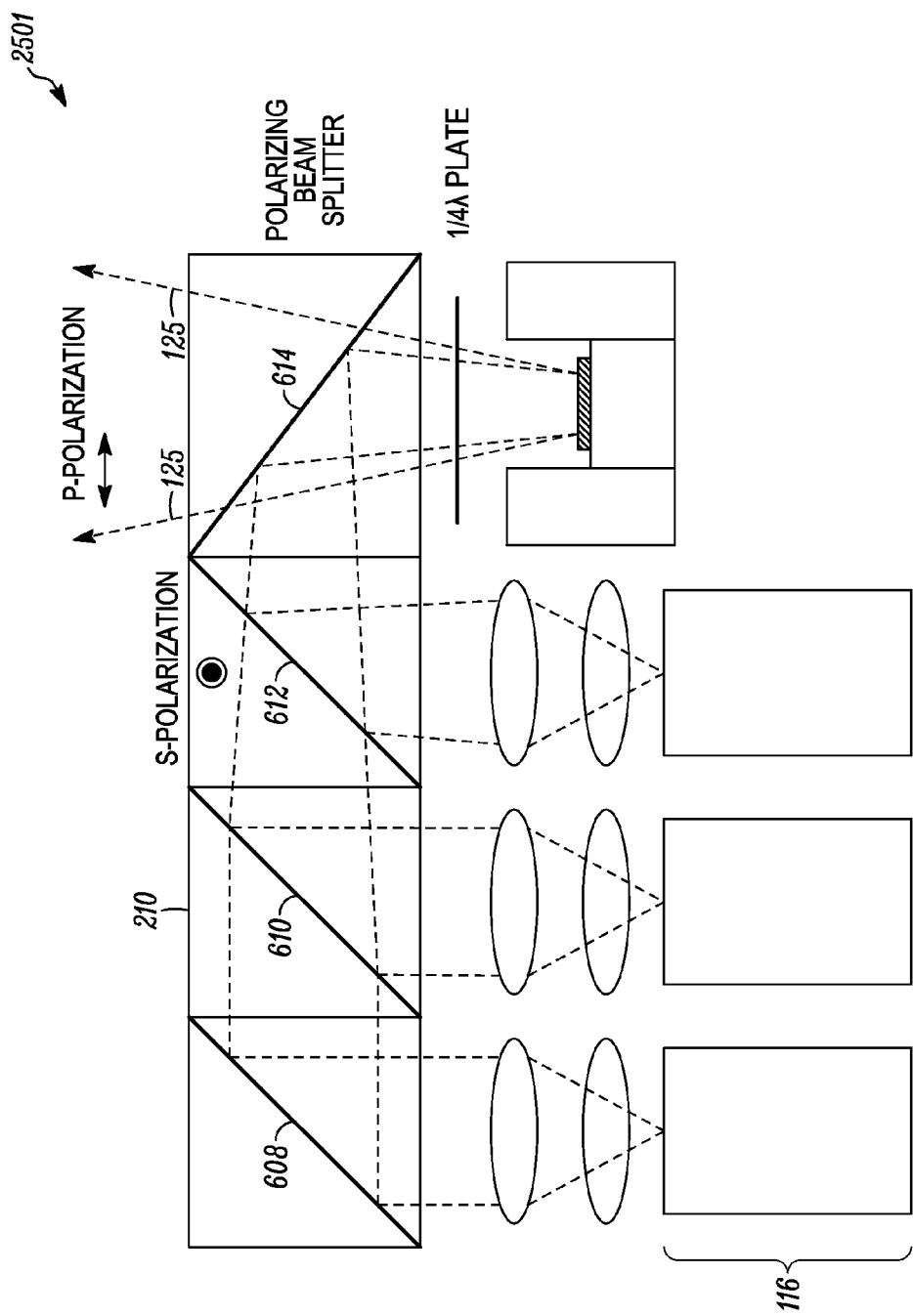
FIG. 25A is a diagram illustrating light transmission in at least a portion of an integrated photonics module according to another embodiment.

FIG. 25A is a diagram illustrating another embodiment 2501 wherein the fold mirror 614 is integrated into the beam combiner 210. The embodiment has a configuration that outputs the scanned beam 125 in a forward direction relative to the light sources 116. The plane of the fold mirror 614 is configured to be substantially at a right angle to the planes of the combining mirrors 608, 610, and 612.

Figure 25B:
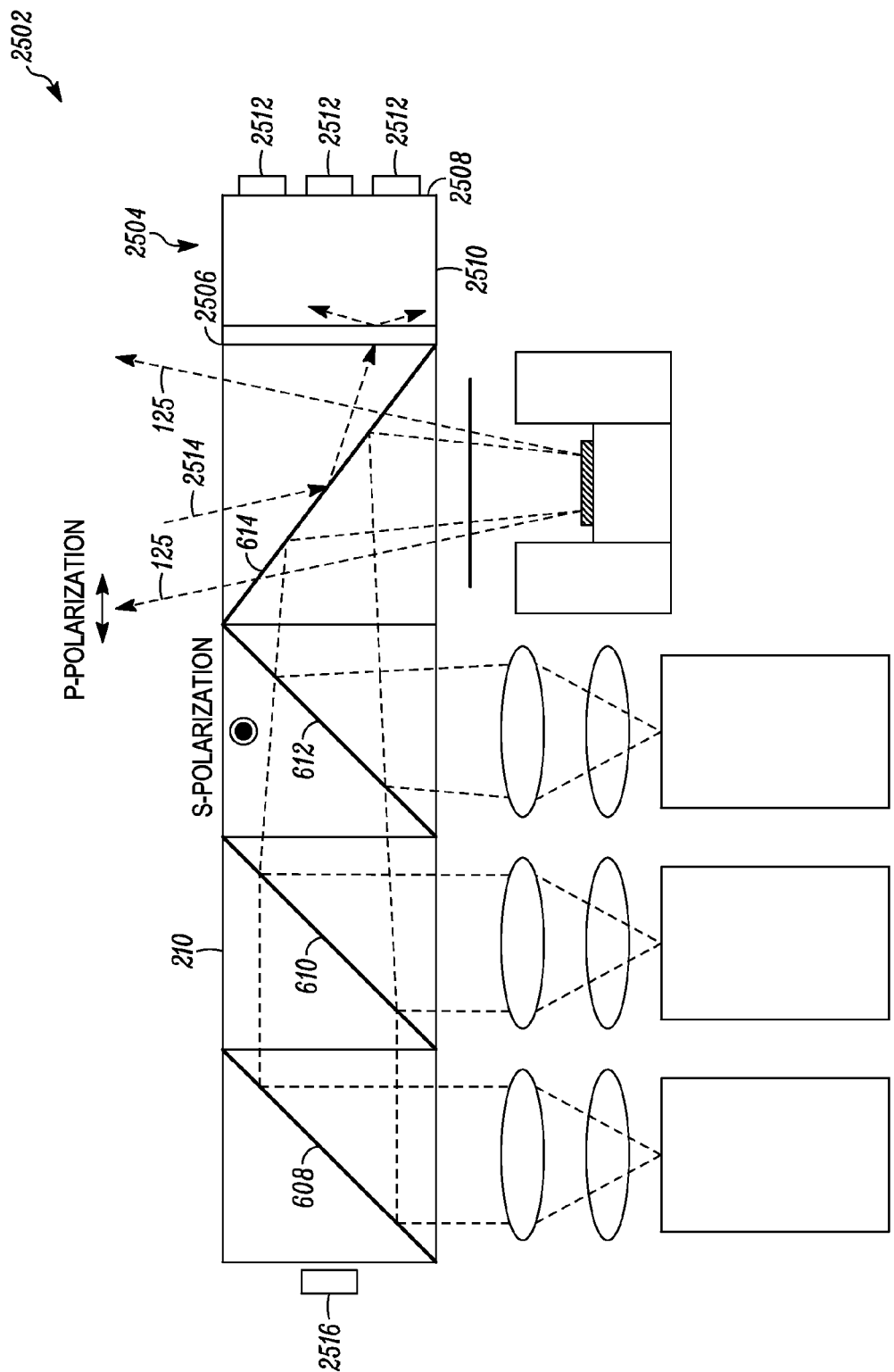
FIG. 25B is a diagram illustrating at least a portion of an integrated photonics module including non-imaging detectors according to an embodiment.

FIG. 25B is a diagram illustrating an embodiment 2502 comprising least a portion of an integrated photonics module including non-imaging detectors. The embodiment 2502 includes a light detection module 2504 that may comprise an optional light diffuser 2506, an optional spacer 2508, optional reflective sidewalls 2510, and non-imaging light detectors 2512. As noted above, a P-polarized scanned beam 125, which may optionally be made non-modulated, is scanned across a FOV. A portion of the scanned beam 125 may be scattered from objects in the FOV as scattered light 2514. Typically, for non-specular objects, the scattered light 2514 may be non-polarized or elliptically polarized. The scattered light may also typically formed as a bundle of parallel or diverging rays that substantially fill the selective fold mirror 614. The selective fold mirror 614 receives the scattered beam 2514 and reflects its S-component polarization as indicated toward the optional light diffuser 2506. The optional light diffuser 2506 is configured to scatter the received rays over a scattering angle as illustrated. The scattered rays travel through the spacer 2508 to impinge on the light detectors 2512. A portion of the scattered rays may be scattered at angles unlikely to be received by a detector. Optional reflective sidewalls 2510 may be used to redirect such "lost" energy toward the detectors 2512. The detectors 2512, which may for example be configured to receive wavelengths corresponding to the emission wavelengths of the light sources, are operable to convert received light energy into electrical signals. According to an embodiment, an integrated photonics module 2502 may be configured to emit red, green, and blue laser light as a composite scanned beam 125 with the detectors 2512 being filtered to receive corresponding red, green, and blue scattered light from the FOV.

In operation, the electrical signals from the detectors 2512 may be read synchronously with pixel scanning to produce a video image of the FOV.

One or more optional detectors 2516 may be configured to receive a P-polarization component from the FOV, optionally through one or more focusing lenses. If the mirrors 608, 610, and 612 of the beam combiner 210 are made to be wavelength-selective mirrors, then the signal received by the optional detector(s) 2516 may be operable to receive light from the FOV and generate a corresponding electrical signal that is not attributable to the scanned beam. Such light may be used, for example, to determine ambient lighting at the FOV, which may, in turn, be used to determine brightness, color balance, etc. for the light emitters.

Figure 25C:
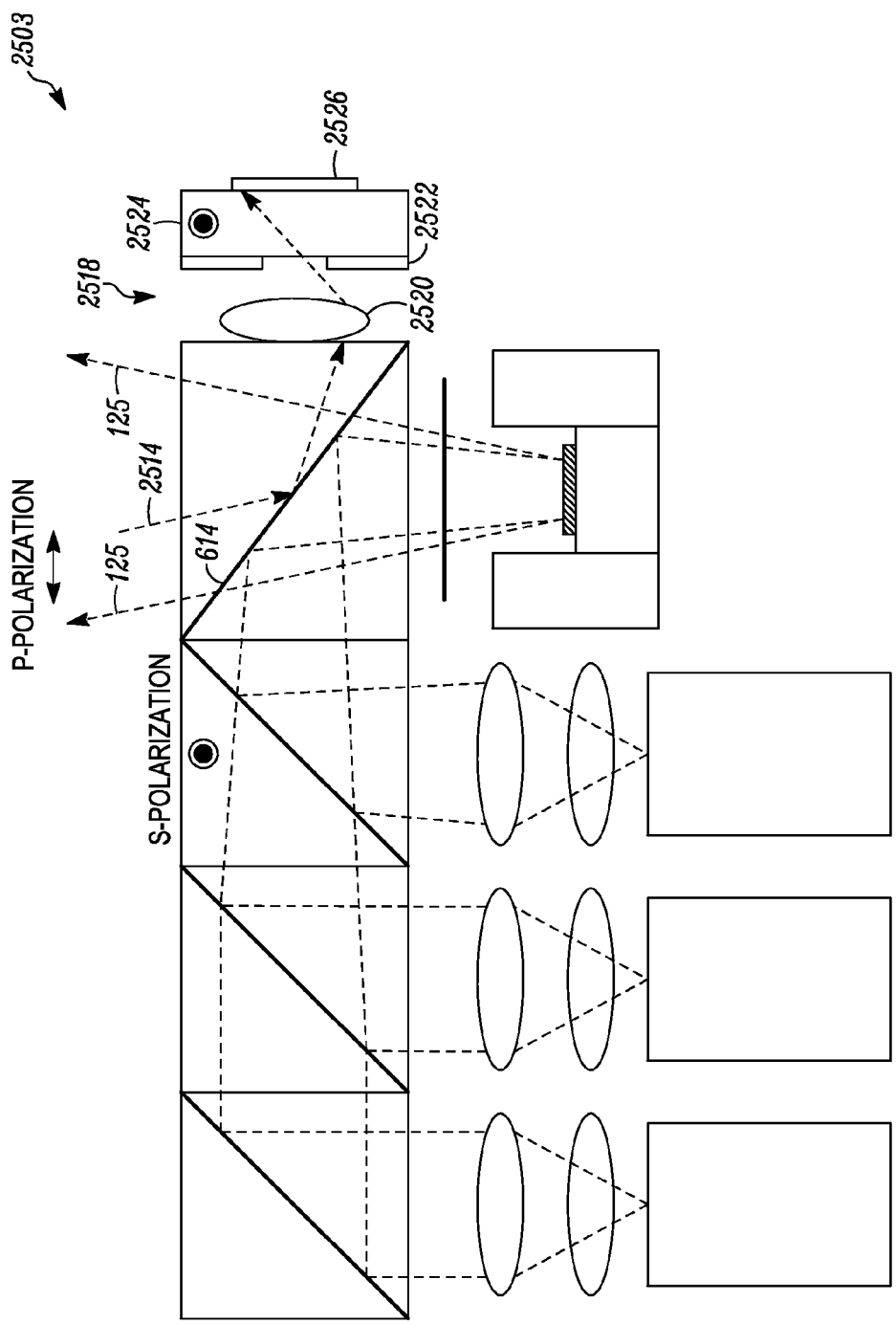
FIG. 25C is a diagram illustrating at least a portion of an integrated photonics module with a focal plane detector array according to an embodiment.

FIG. 25C is a diagram illustrating an embodiment 2503 comprising least a portion of an integrated photonics module including a focal plane detector array. The embodiment 2503 includes a light detection module 2518 that may comprise a lens or lens system 2520, an aperture 2522, a spacer block 2524, and a focal plane detector array 2526 such as a CCD or CMOS pixelated array, for example.

As noted above, a P-polarized scanned beam 125, which may optionally be made non-modulated, is scanned across a FOV. A portion of the scanned beam 125 may be scattered from objects in the FOV as scattered light 2514. Typically, for non-specular objects, the scattered light 2514 may be non-polarized or elliptically polarized. The scattered light may also typically formed as a bundle of parallel or diverging rays that substantially fill the selective fold mirror 614. The selective fold mirror 614 receives the scattered beam 2514 and reflects its S-component polarization as indicated toward the lens 2520. The lens 2520 and the aperture 2522 are configured to form a conjugate image plane at the far surface of the spacer 2524. The focal plane detector array 2526 is operable to detect the conjugate image of the FOV and convert it to a corresponding electrical signal. In operation, the focal plane detector array 2526 may be read and flushed at a video frame rate, for example during the flyback period of the scanner, to produce a video image of the FOV.

As indicated, the light so imaged may be formed from S-polarized light selected for reflection by the selective fold mirror 614. Alternatively, a polarization rotator such as a detection path quarter wave plate (not shown) may be included, for example between the lens 2520 and the aperture 2522, to convert the plane-polarized light into circularly polarized light. Such an approach may be advantageous, for example, to avoid polarization-dependent acceptance effects associated with the focal plane detector 2526.

Alternatively to the illustrative embodiments of FIGS. 25B and 25C, the detectors 2512 or 2526 may be configured to directly receive scattered light from the FOV rather than receive the scattered light from the selective fold mirror 614.

For applications that include light detection subsystems, such as subsystem 2504 or 2518 of the respective illustrative embodiments of FIGS. 25B and 25C, the controller portions of the system may, of course, be configured and operable to received the electrical signals from the detectors, convert analog signals to digital signals (or simply receive digital signals for detectors with integrated ADCs), and assemble the received signals into video images, decode the received images into corresponding data such as decoded bar code or OCR data, or otherwise process the received signals to perform functions according to the application.

Some embodiments may use signals from the detectors 2512, 2526 to modify the depth and/or timing of light source excitation to modify the scanned modulated beam 125, for example to compensate for projection surface non-uniformity, distance, and/or ambient lighting. Some embodiments for performing such compensation are disclosed in U.S. patent application Ser. No. 11/284,043, entitled PROJECTION DISPLAY WITH SCREEN COMPENSATION, incorporated herein by reference.

Other embodiments may use signals from the detectors 2512, 2526 to compensate for relative motion between the integrated photonics module and the projection surface, for example by modifying the phase relationship between the motion of the beam scanner and the light sources. Some embodiments for performing compensation are disclosed in U.S. patent application Ser. No. 11/635,799, entitled PROJECTION DISPLAY WITH MOTION COMPENSATION, incorporated herein by reference.

Figure 25D:
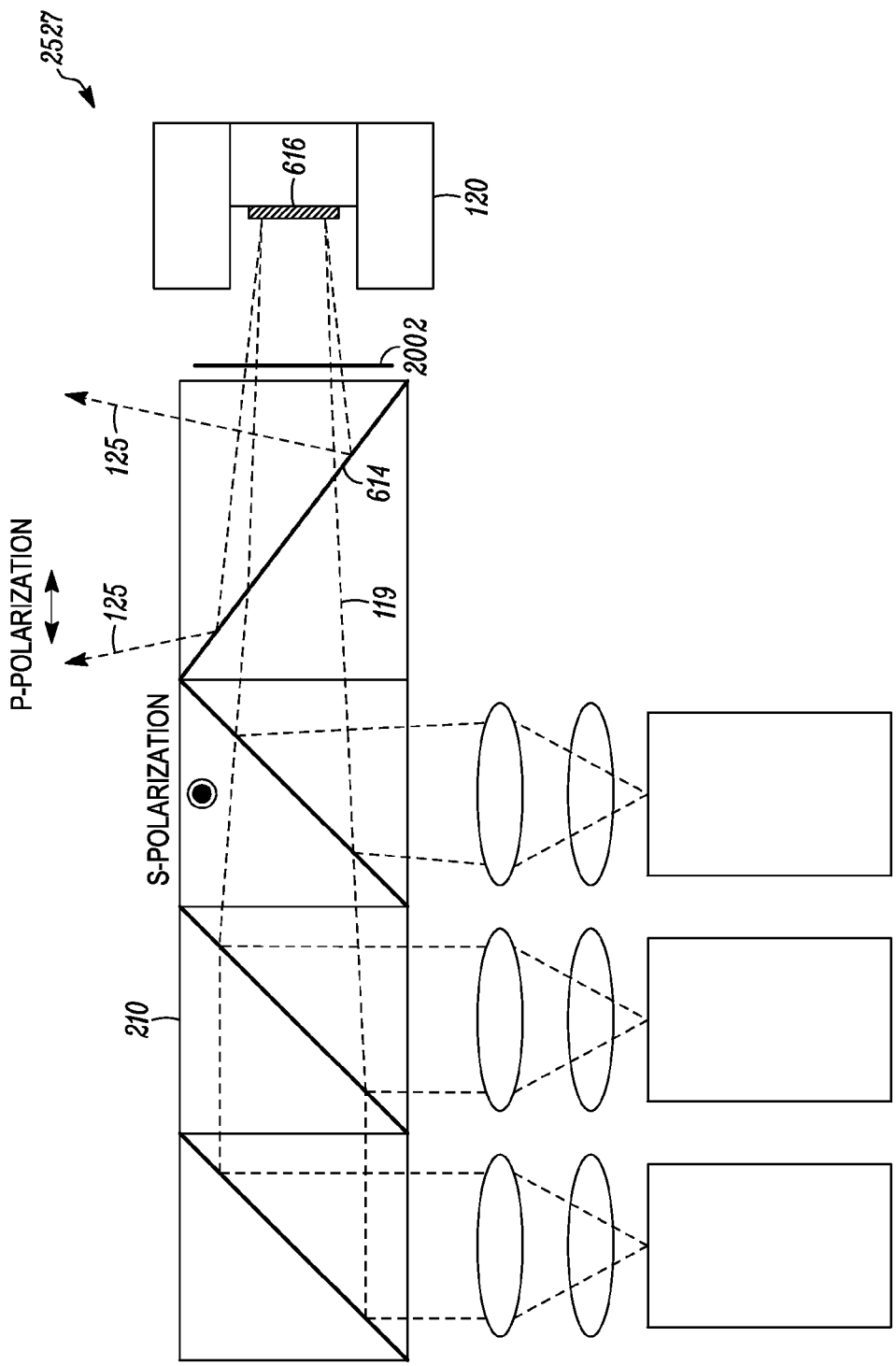
FIG. 25D is a diagram illustrating at least a portion of an integrated photonics module wherein the scanner is aligned to receive a modulated composite beam through the selective mirror according to an embodiment.

FIG. 25D is an embodiment 2527 corresponding to the embodiment 2501 of FIG. 25A but wherein the scanner 120 is moved and the selective fold mirror 614 is oriented 90 degrees to pass the modulated composite beam but reflect the scanned beam 125. The at least a portion of the modulated composite beam 119 having S-polarization is launched from the beam combiner 210 and passes through the selective fold mirror 614, through the polarization rotator 2002, and impinges upon the mirror 616 of the scanner 120. The selective fold mirror 614 is aligned to pass plane polarized light at the angle corresponding to that of the modulated composite beam 119 but reflect plane polarized light at the orthogonal polarization angle. The light rotator 2002 rotates the polarization of the composite modulated beam 119 to circular polarization on its way to the scan mirror 616. The scan mirror 616 scans a reflection of the received beam of light in a periodic scan pattern through the polarization rotator 2002. The polarization rotator rotates the polarization of the scanned beam from circular to plane polarization in an orientation substantially 90 degrees from that of the modulated composite beam 119 when launched from the beam combiner 210. The selective fold mirror 614 reflects the rotated scanned beam toward a field of view as scanned beam 125. In the example of FIG. 25D, the scanned beam 125 has S-polarization.

Figure 25E:
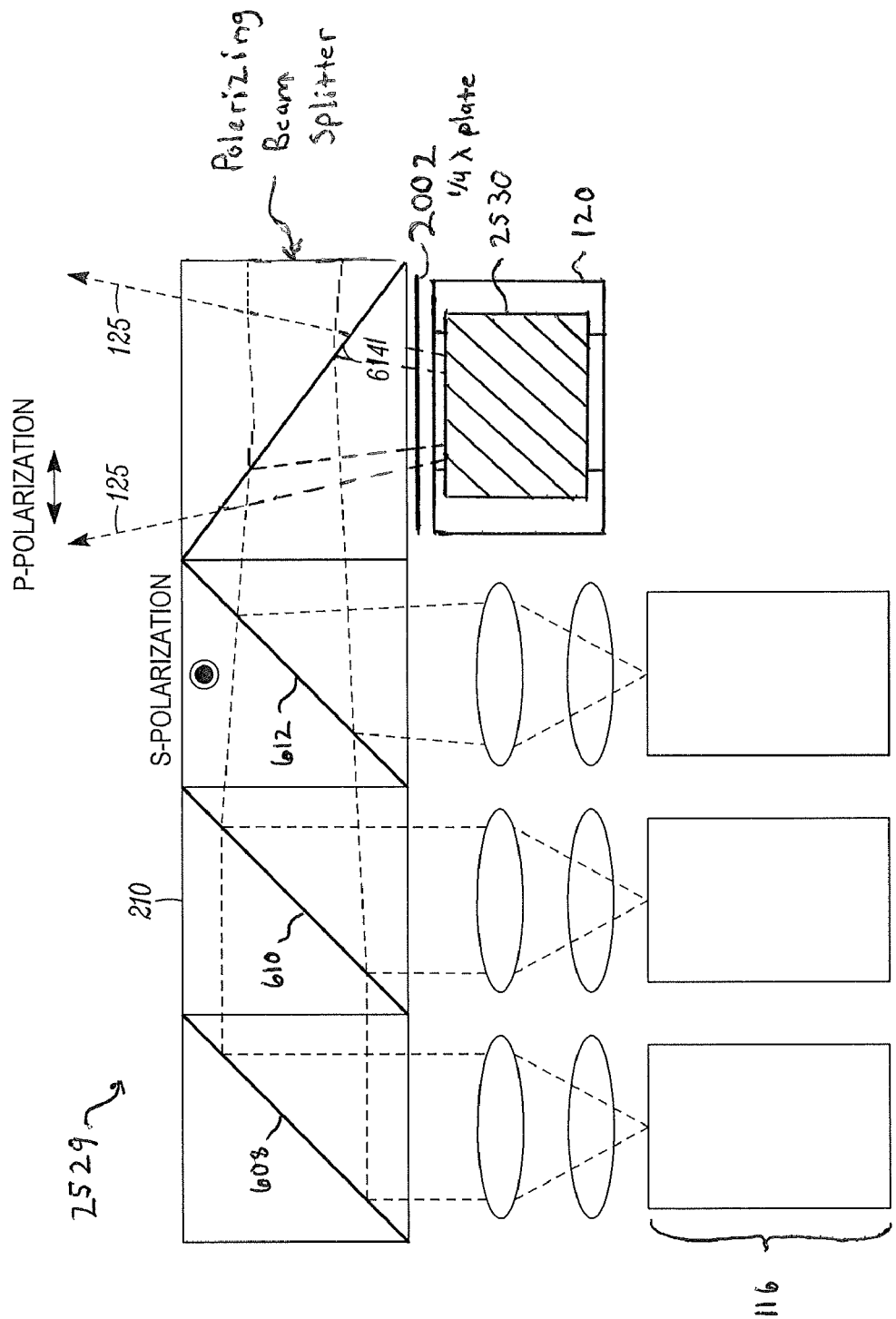
FIG. 25E is a diagram illustrating light transmission in at least a portion of an integrated photonics module according to an embodiment wherein the beam scanner is in a plane other than normal to a nominal image projection direction.

FIG. 25E is a diagram illustrating light transmission in at least a portion of an integrated photonics module 2529 according to an embodiment wherein the beam scanner is in a plane other than normal to a nominal image projection direction. As with the embodiment of FIG. 25A, a polarization selective fold mirror 614, which may for example be configured as a polarizing beam splitter, is configured to direct the modulated composite beam of light in the direction indicated, toward a polarization rotator 2002. After passing through the polarization rotator, the modulated composite beam of light is directed by a vertical fold mirror 2530 toward a beam scanning assembly 120 (partially obscured by the mirror 2530) to impinge upon the scan mirror (not shown). The scanned light then reflects back off the mirror 2530, through the polarizing beam splitter 2002, and owing to its rotated polarization, through the selective fold mirror 614 and into the field of view as the scanned beam 125. According to one embodiment, the scanning mirror may be configured to nominally be in the plane of the figure and hence lying in a plane parallel to the nominal video projection axis. This approach may offer, among other things, a thinner package in the dimension normal to the figure by allowing the permanent magnets of the scanning assembly 120 to have a smaller outer size in the thickness dimension. The fold mirror 2530 may, for example, be a first surface metal, dielectric or other mirror that reflects substantially all the light impinging on it, at least over wavelengths corresponding to the output wavelengths of the light sources 116. Of course, the position of the polarization rotator 2002 may be varied, such as lying between the vertical fold mirror 2530 and the scanner mirror (not shown).

Figure 26:
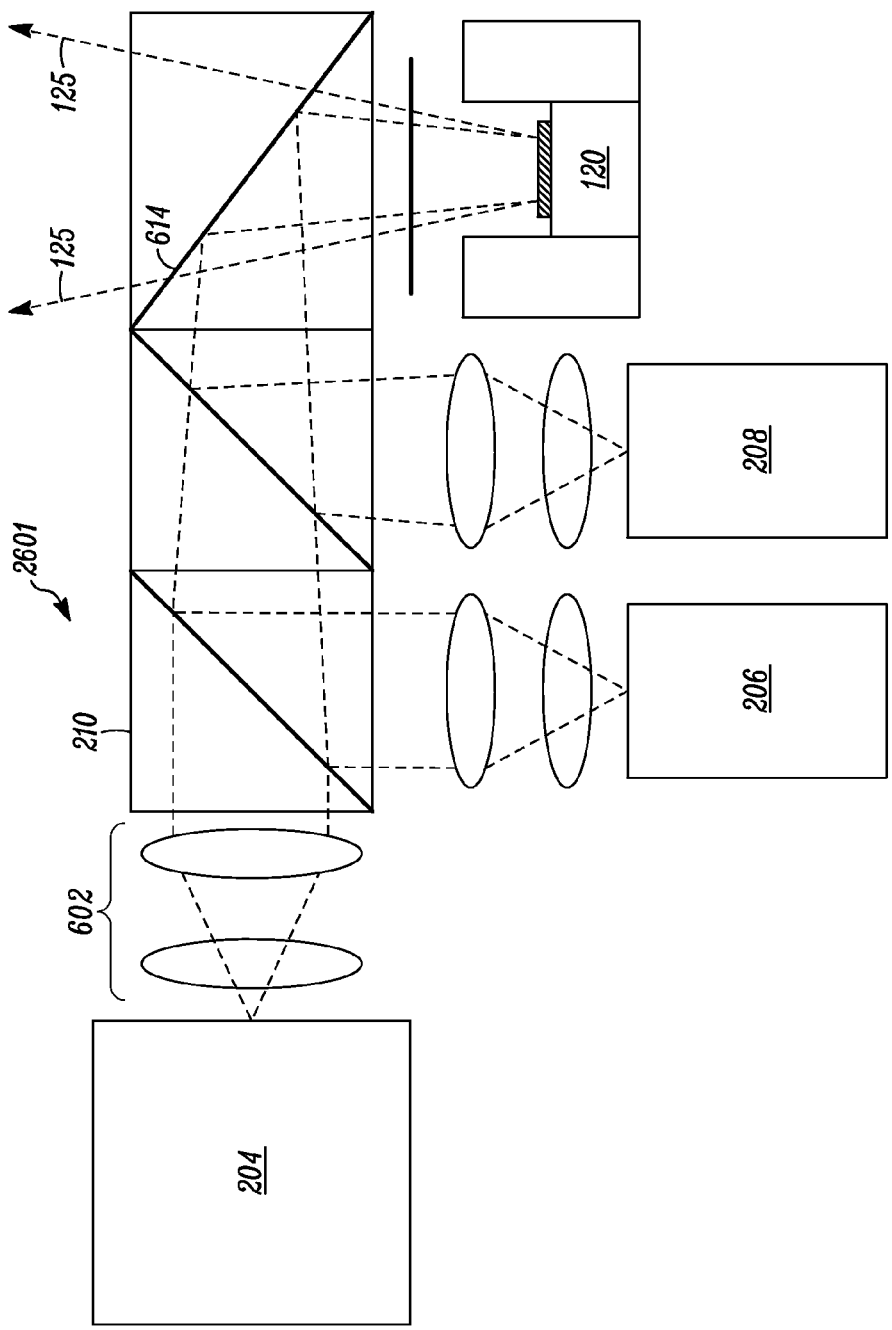
FIG. 26 is a diagram illustrating light transmission in at least a portion of an integrated photonics module according to another embodiment wherein one light source is aligned axially with the beam combiner.

FIG. 26 is a diagram illustrating an alternative embodiment 2601 wherein one of the light sources 204 is configured to launch its beam from the end of the beam combiner 210. As shown, its beam is launched through beam shaping optics 602 into an end opposite that of the fold mirror 614 and the scanner 120. The embodiment 2601 may be especially advantageous when a physically large light source 204 is used.

Figure 27:
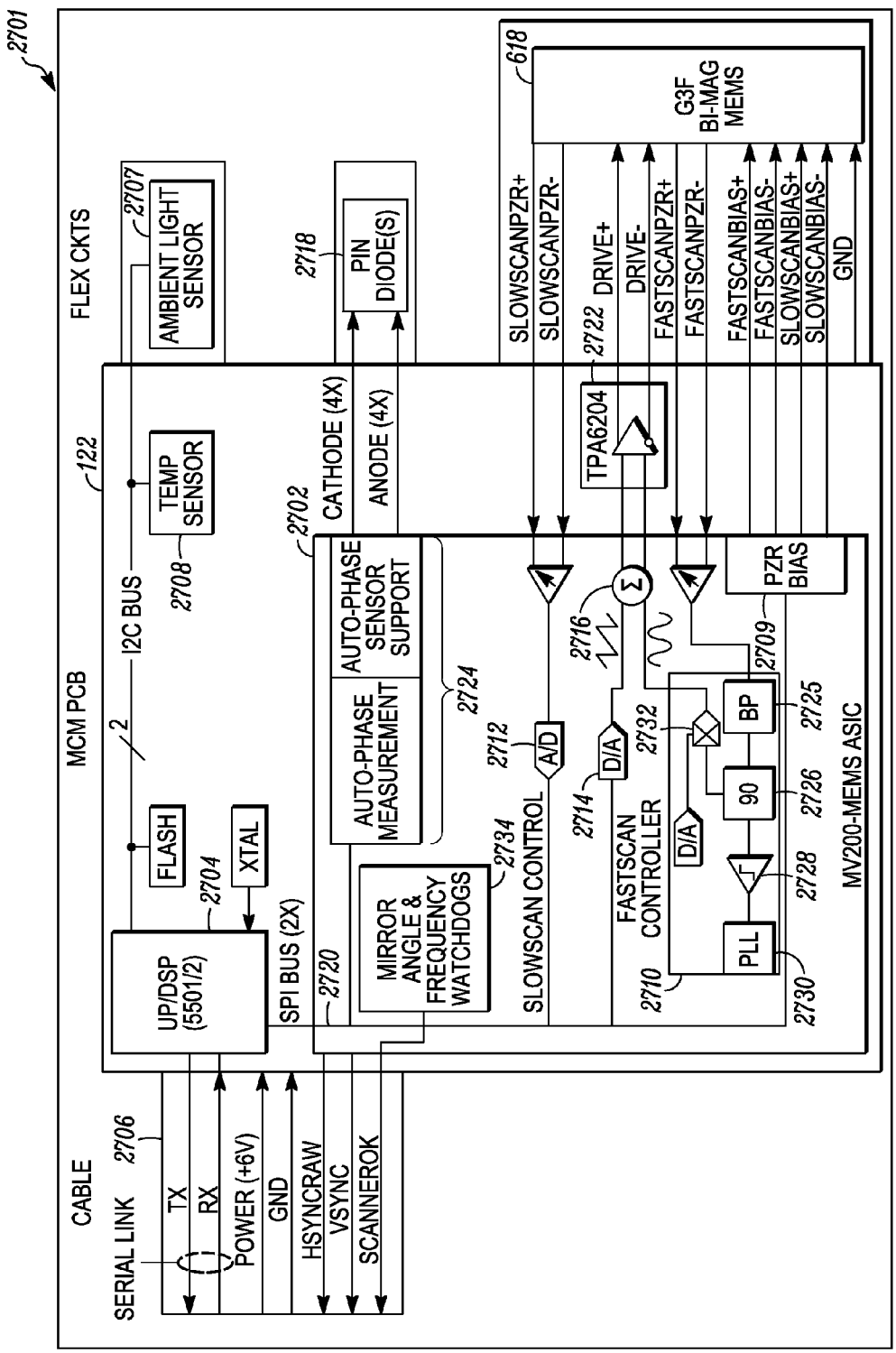
FIG. 27 is a block diagram of a scanner controller comprising at least a portion of an integrated photonics module according to an embodiment.

FIG. 27 is a block diagram 2701 that includes a scanner controller 122 comprising at least a portion of an integrated photonics module according to an embodiment.

According to the embodiment of FIG. 27, the scanner controller 122 includes a scanner control ASIC 2702, a digital signal processor (DSP) 2704 that is operable as a co-processor, supporting circuitry including power supply circuitry and memory, and flex circuit interconnects on a printed circuit board. It may be noted that the embodiment of FIG. 27 comprises a somewhat reduced level of integration compared to the scanner controller 122 of FIG. 1, in which a larger portion of control functionality is integrated into the scanner control ASIC. According to various embodiments, the general theory of operation may be similar.

The scanner controller 122 is operable to drive a bi-axial MEMS scanner while providing appropriate timing information to video controller electronics 106 (not shown in FIG. 27) across the controller interconnection 2706. The scanner controller 122 may additionally be operable to monitor ambient light levels and process auto-phase calibration pulses and optionally relay these measurements to the video controller electronics.

As described and shown in FIG. 12, one scanner embodiment includes a MEMS scanner with magnetic drive on two axes and PZR sensors for both axes.

According to some embodiments, the scanner controller 122 may be physically mounted near an optical engine portion 114 (not shown) of the integrated photonics module. According to some embodiments such as a head-mounted display as described above, the scanner controller 122 may reside at a distal location near the scanner and may be physically separated from the light source 116 (not shown) and at least a portion of the beam combiner and beam shaping optics 118 (not shown), the light source and beam shaping optics being configured to provide light to the mirror of the MEMS scanner 618 from a proximal location through an optical fiber to the distal location. Similarly, the video controller electronics 106 (not shown) may be mounted proximally near the light source and beam shaping optics and communicate with the distally mounted scanner controller 122 via an electrical, radio, or optical interface 2706. In such an embodiment, it may be appropriate to mount the proximal portions of the integrated photonics module in a compact package that may be supported on a belt of the user and mount the distal portions of the system in a head-mounted package.

According to an embodiment, the DSP 2704 may provide slow scan Fast Fourier Transformation (FFT) processing to provide tuning and active damping of the slow scan according to methods disclosed in U.S. patent application Ser. No. 11/266,584, entitled CIRCUIT FOR DRIVING A PLANT AND RELATED SYSTEM AND METHODS, incorporated herein by reference. Additionally, the DSP 2704 may provide functionality including one or more of data communications with the video controller electronics; provide an interface for inputting calibration data for the MEMS scanner; pass parameters related to MEMS operation, auto-phase results, ambient brightness received from an ambient light sensor 2707, temperature received from temperature sensor 2708, etc. during normal operation to the video controller electronics; an interface for field upgrade of firmware and software; task scheduling to ensure proper timing of critical operations; initialization and adjustment of fast scan oscillator registers; and open-loop temperature compensation of PZR sensors.

According to an embodiment, the scanner drive ASIC 2702 may be a mixed-signal (analog and digital) device operable to provide MEMS control and provide automatic phase (auto-phase) correlation. The scanner drive ASIC 2702 is operable to drive and control a bi-axial MEMS scanner 618. The bi-axial MEMS scanner 618 may be of a type that is magnetically actuated on both axes with piezo-resistive (PZR) feedback sensors. According to embodiments, the scanner drive ASIC 2702 may include some or all of a variety of analog and digital functions including, for example, providing user programmable current bias to the PZR feedback sensors with a PZR bias circuit 2709; providing a closed-loop oscillator circuit 2710 operable to self-resonate the fast scan axis at a programmable amplitude, wherein AGC parameters may be adjustable allowing soft-start and tuning control options; provide a phase-locked loop (PLL) to create a slow scan sample clock (50 to 200 kHz) that is synchronous with the fast scan resonant frequency, wherein the multiplication factor may be programmable; provide a slow Scan analog to digital converter (ADC) 2712, wherein the slow scan input signal from the PZR amplifier is converted to a digital signal for the DSP processor 2704, wherein the ADC resolution may be 12 to 16 bits with a sample rate of 50 to 200 kHz; provide a slow scan digital to analog converter (DAC) 2714, wherein the digital input signal for the slow scan waveform is converted to an analog voltage and summed with the fast scan drive signal in a summing circuit 2716; provide a mirror status signal indicating the mirror angle is within the acceptable range; provide auto phase sensor interface circuitry, wherein the circuitry operates with external photo detector(s) 2718 to condition the signals for the auto phase function and measures the result; and provide an SPI serial digital interface 2720 to communicate with the video controller electronics and allow read/write access to the internal registers for initialization and monitoring.

The Fast Scan Oscillator block 2710 uses the PZR feedback signal to create a closed loop oscillator circuit. The oscillation frequency is determined by the resonant frequency of the scanner's fast scan axis. The amplitude of the oscillation is controlled by an AGC circuit that has a programmable set point. The output from this loop is the FS SYNC which is a square wave at the FS resonant frequency that provides a master synchronization signal to drive other system components. The resonant frequency can vary from about 5 kHz to 40 kHz.

The slow scan position signal is received from the slow scan PZRs on the MEMS scanner 618, then amplified, filtered, and converted to digital in the slow scan ADC 2712. This digital signal is sent to the DSP 2704 for analysis. The DSP sends back a digital command signal that is converted to analog in the slow scan DAC 2714. The analog slow scan drive signal is summed with the fast scan output in the summing circuitry 2716, and the sum is sent to the external power amplifier 2722, which amplifies the summed analog signal to provide drive power to the scanner 618.

The Auto Phase circuitry 2724 works with one or more external optical detectors 2718. The scanned beam 125 (not shown) periodically crosses over the detector(s) 2718. The analog interface circuit 2724 produces a pulse in response to the laser beam crossing, and the pulse length is the information that is transmitted to the DSP 2704.

The fast scan oscillator 2710 is designed to be an analog 'self-resonant' circuit that takes real-time position information from the MEMS PZR sensors, applies appropriate amplitude gain and phase delay, and drives the mirror on resonance based on the mirror's feedback signal. Blocks with registers may be adjustable via the SPI processor interface to provide MEMS characterization to accommodate device-to-device, lot-to-lot, and/or design-to-design tolerances.

As described in conjunction with FIG. 12, the fast scan motion of the mirror is sensed with PZR strain sensors incorporated in the die flexures on the MEMS scanner 618. The PZR sensors are provided an adjustable DC bias current by the PZR bias circuitry 2709. The bias current may be programmed with a software controlled value or with an external resistor. The PZR feedback differential sense signals are amplified in a low-noise differential pre-amplifier 2722 with an adjustable gain. The gain of the differential pre-amplifier 2722 may be software controlled or may be set with an external resistor to provide calibrated signal level (in peak-to-peak voltage) for a given mirror angular deflection. The pre-amplifier 2722 output is filtered in the band pass filter 2725 that limits the noise bandwidth. The band pass filter 2725 may include a high pass filter followed by a low pass filter. The output signal of the band pass filter 2725 may be used to drive the scanner control system. At resonance, there is a 90 degree phase shift between the drive signal and the scanner motion. To sustain closed loop oscillation, an extra 90 degrees of phase shift is introduced into the loop with phase shifter 2726. The output of the phase shifter 2726 is 'squared up' in a comparator 2728 to create a digital fast scan synchronization signal. The fast scan synchronization signal may transmitted through a phase-locked loop output 2730 to the DSP 2704 and used as the primary time base for the slow scan drive as well as the video signal processing that is performed in the video controller electronics 106 (not shown).

An automatic gain control (AGC) circuit may be used to maintain the oscillation amplitude at a very precise value. The loop may include an amplitude detector, a variable gain amplifier, and an AGC controller. The amplitude detector produces a DC voltage proportional to the amplitude of output of the band pass filter 2725. This voltage is compared to the set point in the AGC controller, which implements a proportional-integral-differential (PID) control algorithm. The output of the PID controller is used as the control voltage input of a variable gain amplifier 2732.

Mirror angle and frequency watchdog circuits 2734 monitor the output of the amplitude detector. If the amplitude exceeds a programmable set point, then the protection circuit issues a shutdown command that immediately disables the drive signal. A secondary safety circuit monitors the amplitude of the drive signal, and prevents it from exceeding a programmable value.

Figure 28:
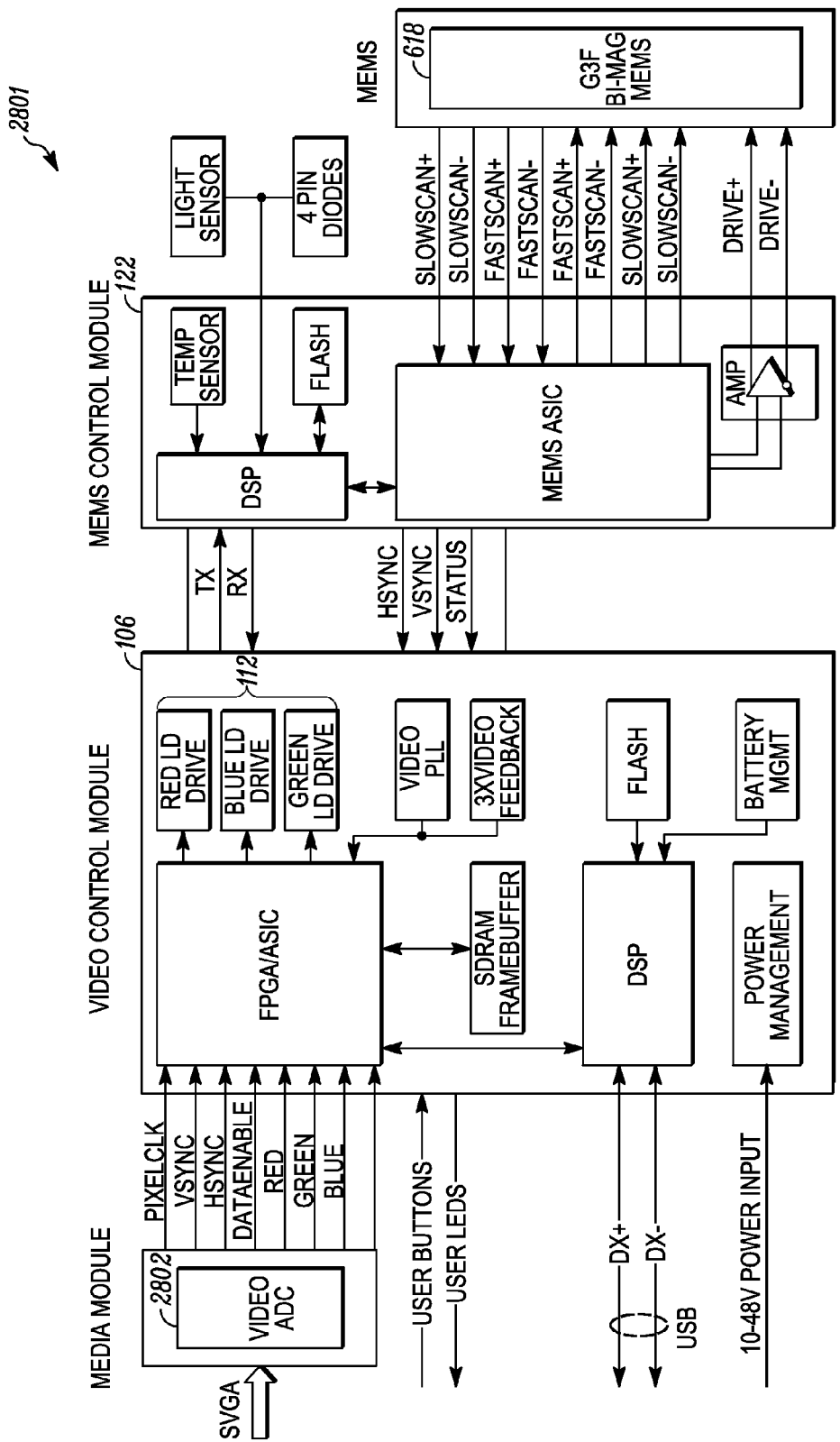
FIG. 28 is a block diagram of a display controller including light source and scanner controller comprising at least a portion of an integrated photonics module according to an embodiment.

FIG. 28 is a block diagram 2801 for an integrated photonics module controller including a video controller 106, a scanner controller 122, and a beam scanner 618 according to an embodiment.

The video controller 106 may be operable to perform some or all of: receiving a video signal from a system resource, optionally caching the received video data in video memory, converting the signal to a de-gamma signal, converting the de-gamma signal to an equalized color signal, buffering lines, performing interpolation to determine the value of actual pixel positions scanned by the scanned beam as a function of ideal pixel positions in the received video signal, determining luminance values for light sources, performing light source compensation and calibration, and passing compensated luminance values to light source drive circuitry synchronously with timing signals received from a pixel clock, the pixel clock being generated by horizontal and vertical synchronization pulses provided by the MEMS control module 122.

Optionally, the video controller 106 may include a media module 2802 operable to convert a received video format into a preferred video format. According to one embodiment, the media module 2802 may be operable convert a received analog video signal into a digital video signal. According to other embodiments, the media module may be omitted or may be integrated as a system resource.

Aspects of several embodiments of operability of the integrated photonics module controller 2801 are disclosed in U.S. patent application Ser. No. 11/316,326, entitled CIRCUIT FOR DETECTING A CLOCK ERROR IN A SWEPT-BEAM SYSTEM AND RELATED SYSTEMS AND METHODS; U.S. patent application Ser. No. 11/316,683, entitled CIRCUIT FOR DETECTING A CLOCK ERROR IN A SCANNED IMAGE SYSTEM AND RELATED CIRCUITS, SYSTEMS, AND METHODS; U.S. patent application Ser. No. 10/630,062, entitled METHOD AND APPARATUS FOR ILLUMINATING A FIELD-OF-VIEW AND CAPTURING AN IMAGE; U.S. patent application Ser. No. 10/441,916 entitled APPARATUS AND METHOD FOR BI-DIRECTIONALLY SWEEPING AN IMAGE BEAM IN THE VERTICAL DIMENSION AND RELATED APPARATI AND METHODS; U.S. patent application Ser. No. 10/118,861 entitled ELECTRONICALLY SCANNED BEAM DISPLAY; U.S. patent application Ser. No. 10/933, 033 entitled APPARATUSES AND METHODS FOR UTILIZING NON-IDEAL LIGHT SOURCES; U.S. Pat. No. 6,661,393 entitled SCANNED DISPLAY WITH VARIATION COMPENSATION; and U.S. Pat. No. 6,445,362 also entitled SCANNED DISPLAY WITH VARIATION COMPENSATION; all incorporated by reference herein.

Figure 29:
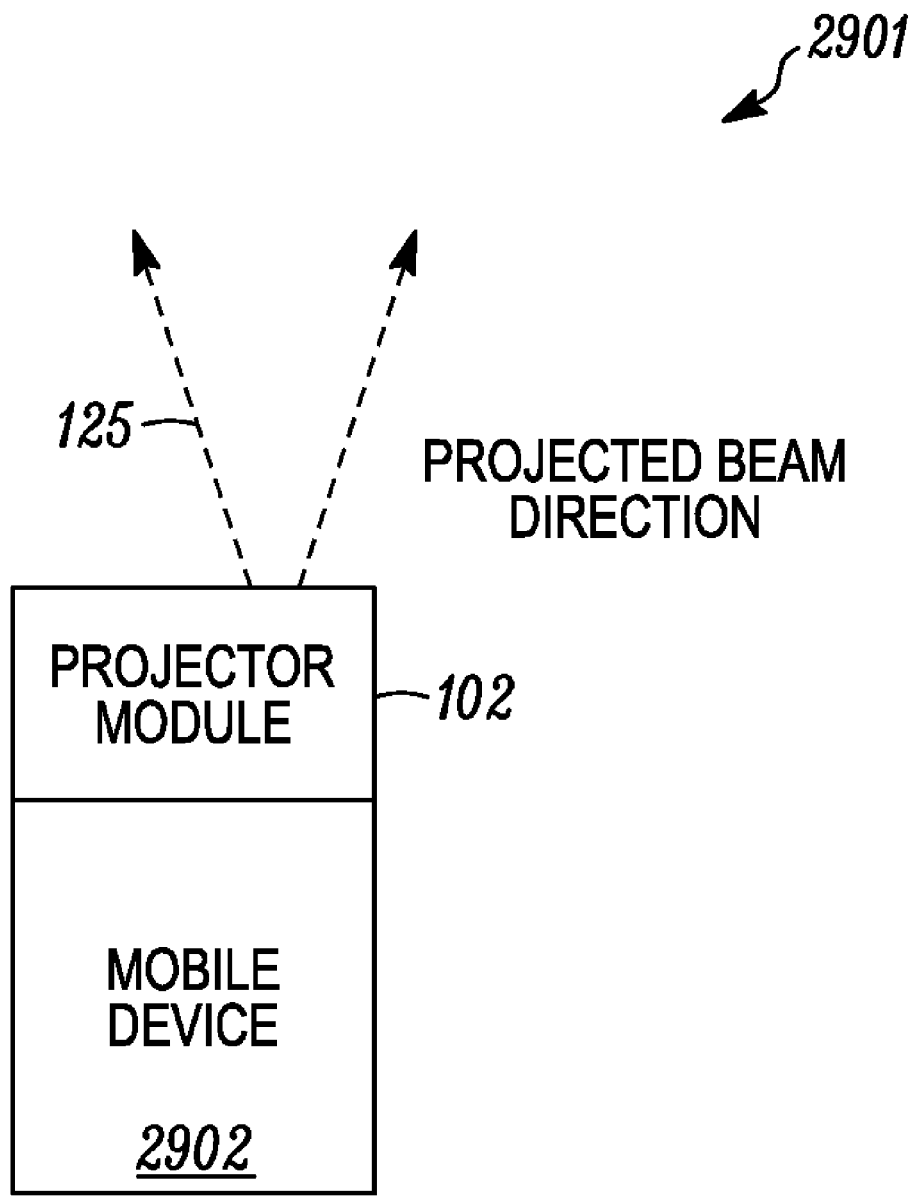
FIG. 29 is a diagram illustrating the use of an integrated photonics module integrated into a mobile electronic device according to an embodiment.

FIG. 29 is a diagram illustrating the use of an integrated photonics module 102 integrated into a mobile electronic device 2902 according to an embodiment 2901. As may be seen, the embodiment is configured to emit a scanned beam of modulated light 125 in a direction nominally aligned with the top or long dimension of the portable electronic device 2902. Optionally, the integrated photonics module 102 may be configured to launch the scanned beam in a different direction or in a plurality of directions. Alternatively, the integrated photonics module 102 may be configured to project an image onto the back side of a diffuser, thus forming a rear-projection screen.

The mobile device 2902 may comprise a range of device types including but not limited to a bar code scanner, a portable computer, a palm-top computer, a mobile telephone, a portable audio device such as an mp3 player, a hard-disk based portable audio player, a portable video player, a hard-disk based portable video player, a digital gaming system, a business presentation pointer, a laser pointer, a front- or rear-projection television, etc.

Figure 30:
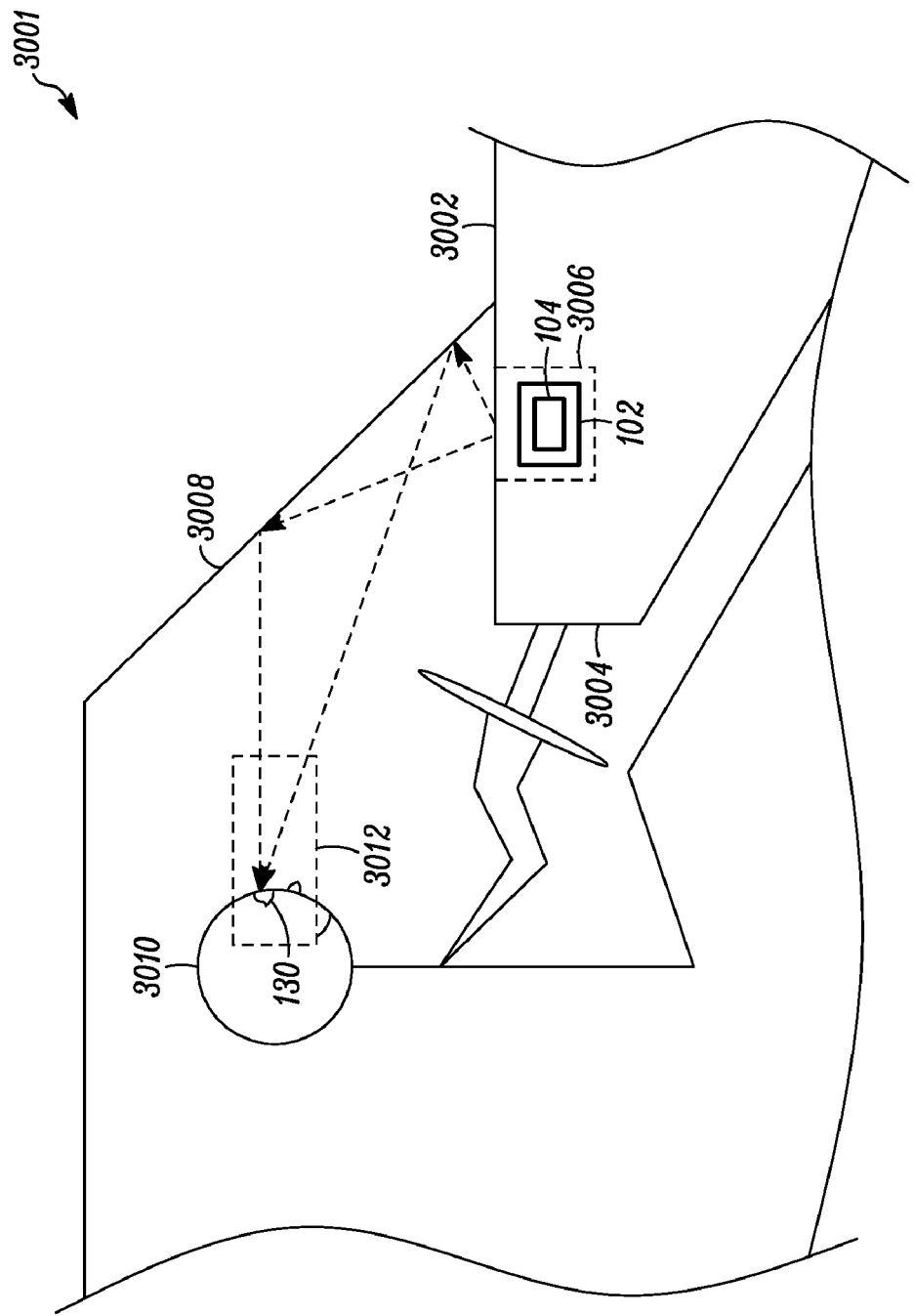
FIG. 30 is a diagram illustrating the use of an integrated photonics module in a heads-up display application according to an embodiment.

FIG. 30 is a diagram illustrating the use of an integrated photonics module in an automotive heads-up display application according to an embodiment 3001. Alternative embodiments or applications may include HUDs for aircraft, watercraft, motorcycles, etc.

A vehicle 3002 may include a dashboard 3004 that houses an instrument cluster 3006. The instrument cluster includes an integrated photonics module 201 with an optical portion 104 configured to project a scanned beam image through relay optics 3008 that may include the windshield of the vehicle toward an occupant 3010. The system may be configured to provide an exit pupil or eye-box 3012 corresponding to the position of one or both eyes 130 of the occupant 3010.

Such a system may be used to present a variety of information to the viewer including but not limited to a low-light forward image, vehicle gauge information, a map or driving directions, entertainment content, advertising content that may optionally be related to the location of the vehicle 3002, emergency information, etc.

Figure 31:
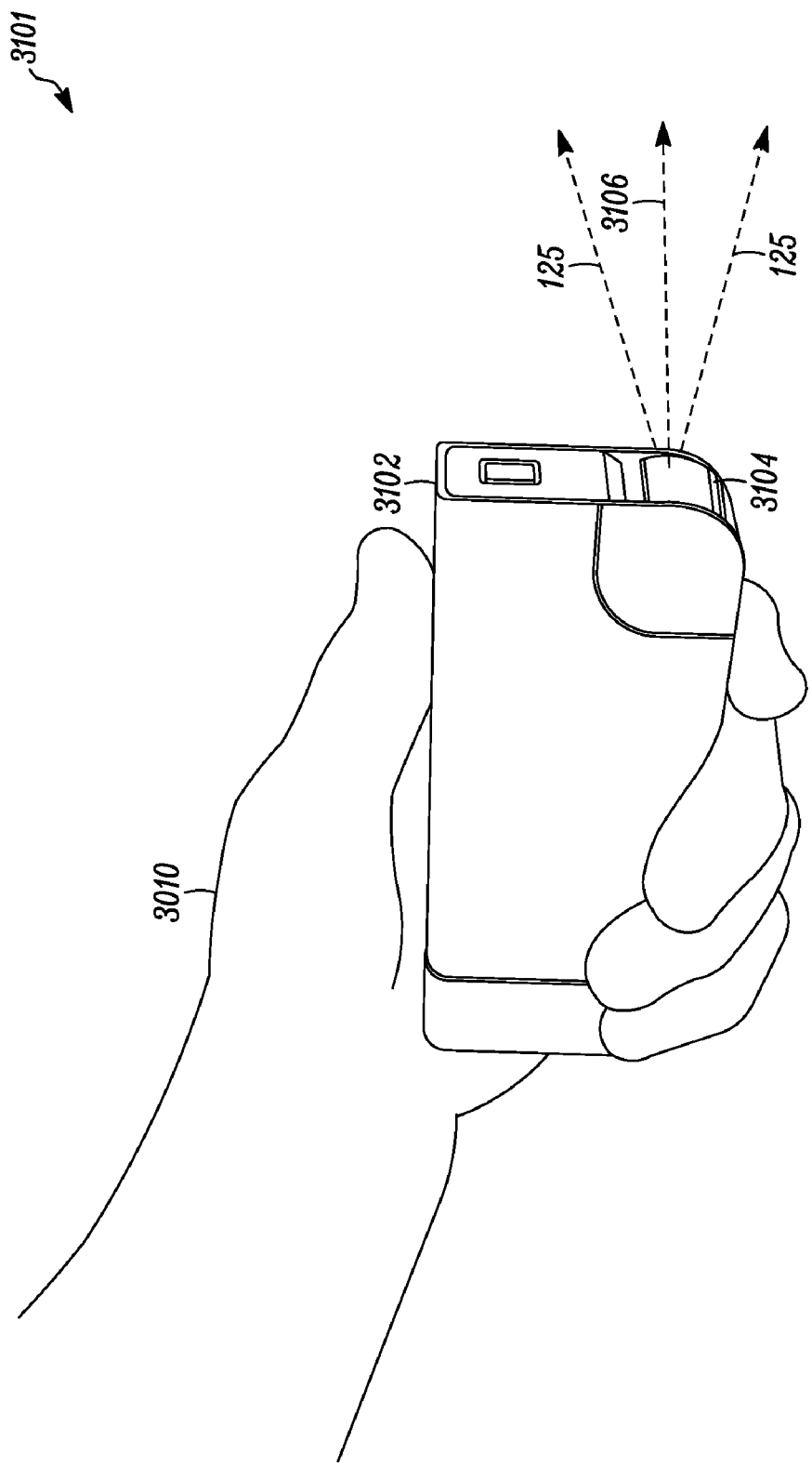
FIG. 31 is a perspective view of a portable scanned beam projection display using an integrated photonics module according to an embodiment.

FIG. 31 is a perspective view of a portable scanned beam projection display 3102 using an integrated photonics module according to an embodiment 3101. As illustrated in FIG. 31, the portable projection display 3102 may be held in the hand of a user 3010 according to a configuration of an embodiment. An output optical element 3104 is shown configured to project an image through a scanned beam 125 in a direction 3106 aligned longitudinally with the body of the portable video projector 3102 as desired by the user.

According to another embodiment, the portable video projector 3102 may project and/or detect a control field. Optionally, the display field of view may be monitored with a detector such as a scattered light detector to enable feedback for use as a mouse, pointer, etc. as may be desired by the user, such as for controlling the projected image.

As illustrated in FIG. 31, the portable scanned beam projection display 3102 may includes a body having an output optical element 3104 mounted thereon according to an embodiment. According to some embodiments, output element 3104 may be rotated to a range of positions. For example, in a first position the optical element is shielded by the body of the device and the device is switched to an "off" or hibernate state. The position of the optical element 3104 may be sensed, for instance using an optical encoder, a rotary switch, or the like to automatically switch modes. In another exemplary position, the optical element 3104 may be rotated to project an image generally forward at one or more angles appropriate for intersecting a table surface. The projected image may optionally be automatically rotated such that "top" is positioned toward the base of the body of the device 3102 for convenient viewing by a user facing the front of the body. In a third exemplary position, the optical element 3104 may be rotated to a position generally forward and parallel with the table surface, for example generally perpendicular to the long axis of the body of the portable video projector 3102, to project an image on a wall while the body is positioned on a table. The position may be adjusted upward or downward from parallel with the table surface to select an image height on the wall. The projected image may optionally be automatically rotated to project an image whose "top" is oriented in an upward direction on the wall.

In a fourth position illustrated in FIG. 31, the optical element 3104 is rotated to a position generally parallel with the longitudinal axis of the body of the portable video projector 3102. In this mode, the image projector may be conveniently held in the hand of a user and pointed toward a vertical or horizontal surface, such as while giving an ad hoc presentation.

As indicated above, the integrated photonics modules used in various applications may include image capture functionality. Images captured may be used to perform a variety of functions. For example it may be desirable for an embodiment of the system 2901 of FIG. 29 to act as a laser camera in addition to providing a projection display.

The system 3001 of FIG. 30 may include analysis of captured video to sound an alarm, perform a system shutdown, convert to an "auto-pilot", store a video or still image etc. depending upon a determined characteristic of one or more vehicle occupants 3010. For example, if it is determined that the driver or pilot 3010 is in a near-sleep state, an alarm may be used to awaken the individual. If it is determined that the occupant is unknown and an alarm system has been disabled or otherwise tampered with, the system may capture an image of the occupant, shut down the vehicle, and/or notify a law enforcement representative of the state. If analysis of a series of video frames determines the occupant may be under the influence, the system may notify the occupant to pull the vehicle to the side of a road and subsequently perform at least a partial system shutdown until impairment is no longer an issue.

Similarly, the system 3001 may adjust display brightness, content, etc. dependent upon detected FOV or ambient lighting, etc.

As mentioned earlier, the system 3101 may act upon a captured image to control the display content. Such action may be used, for example, to "pan" the display as a larger portion of a virtual image, correct for display surface irregularities, compensate for relative motion between the display surface and the portable video projector, etc.

The preceding overview of the invention, brief description of the drawings, and detailed description describe exemplary embodiments according to the present invention in a manner intended to foster ease of understanding by the reader. Other structures, methods, and equivalents may be within the scope of the invention. The scope of the invention described herein shall be limited only by the claims.

What is claimed is:

1. A scanned beam display engine comprising:
   an optical frame configured for mechanical mounting to a host system;
   at least one light source coupled to the optical frame and operable to emit a beam of modulated light, wherein the light source includes at least two light sources;
   a MEMS scanner coupled to the optical frame aligned to receive the beam of modulated light and operable to periodically scan the beam of modulated light across a field-of view as a scanned beam to produce a projected video image;
   a beam combiner mechanically coupled to the optical frame and held in alignment thereby and configured to combine beams of modulated light from the at least two light beams into a composite beam of modulated light; and
   wherein the beam of modulated light the MEMS scanner is aligned to receive includes the composite beam of modulated light.

2. The scanned beam display engine of claim 1 further comprising:
   a selective fold mirror aligned to receive the beam of modulated light and direct the beam of modulated light toward the MEMS scanner.

3. The scanned beam display engine of claim 2 wherein the selective fold mirror is configured to substantially direct one plane of polarization toward the MEMS scanner.

4. The scanned beam display engine of claim 3 further comprising:
   a polarization rotator aligned to receive the beam of modulated light from the selective fold mirror and operable to convert the beam of plane-polarized modulated light to a circularly polarized beam directed toward the MEMS scanner.

5. The scanned beam display engine of claim 4 wherein the polarization rotator is further aligned to receive the circularly polarized scanned beam from the MEMS scanner and configured to convert the circular polarization of the scanned beam to a plane polarization oriented substantially at a right angle to the plane of polarization of the light received from the selective fold mirror.

6. The scanned beam display engine of claim 5 wherein the MEMS scanner is aligned to receive the circularly polarized beam from the polarization rotator from a direction substantially normal to a mirror surface of the MEMS scanner.

7. The scanned beam display engine of claim 3 further comprising at least one light detector aligned to receive scattered light from the selective fold mirror.

8. A scanned beam display engine comprising:
   an optical frame configured for mechanical mounting to a host system;
   at least one light source coupled to the optical frame and operable to emit a beam of modulated light;
   a MEMS scanner coupled to the optical frame aligned to receive the beam of modulated light and operable to periodically scan the beam of modulated light across a field-of view as a scanned beam to produce a projected video image;
   a selective fold mirror aligned to receive the beam of modulated light and direct the beam of modulated light toward the MEMS scanner, wherein the selective fold mirror is configured to substantially direct one plane of polarization toward the MEMS scanner; and
   a polarization rotator aligned to receive the beam of modulated light from the selective fold mirror and operable to convert the beam of plane-polarized modulated light to a circularly polarized beam directed toward the MEMS scanner.

9. The scanned beam display engine of claim 8 wherein the polarization rotator is further aligned to receive the circularly polarized scanned beam from the MEMS scanner and configured to convert the circular polarization of the scanned beam to a plane polarization oriented substantially at a right angle to the plane of polarization of the light received from the selective fold mirror.

10. The scanned beam display engine of claim 9 wherein the MEMS scanner is aligned to receive the circularly polarized beam from the polarization rotator from a direction substantially normal to a mirror surface of the MEMS scanner.

* * * * *